United States Patent
Takahashi et al.

(10) Patent No.: US 12,179,758 B2
(45) Date of Patent: Dec. 31, 2024

(54) VEHICLE CONTROL DEVICE, VEHICLE CONTROL METHOD, VEHICLE MOTION CONTROL SYSTEM, AND LANE ESTIMATION DEVICE

(71) Applicant: Hitachi Astemo, Ltd., Hitachinaka (JP)

(72) Inventors: Naoki Takahashi, Hitachinaka (JP); Taku Takahama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 315 days.

(21) Appl. No.: 17/642,162

(22) PCT Filed: Jun. 4, 2020

(86) PCT No.: PCT/JP2020/022156
§ 371 (c)(1),
(2) Date: Mar. 10, 2022

(87) PCT Pub. No.: WO2021/049108
PCT Pub. Date: Mar. 18, 2021

(65) Prior Publication Data
US 2022/0314984 A1     Oct. 6, 2022

(30) Foreign Application Priority Data
Sep. 11, 2019 (JP) .................. 2019-165551

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 40/072* (2013.01);
(Continued)

(58) Field of Classification Search
CPC .... G06V 20/588; B60W 30/12; B60W 10/20; B60W 2520/10
(Continued)

(56) References Cited

U.S. PATENT DOCUMENTS

2011/0320163 A1  12/2011  Markkula et al.
2012/0314070 A1  12/2012  Zhang et al.
(Continued)

FOREIGN PATENT DOCUMENTS

JP  2004-37372 A   2/2004
JP  2012-507780 A  3/2012
(Continued)

OTHER PUBLICATIONS

Extended European Search Report issued in European Application No. 20863379.2 dated Oct. 11, 2022 (five (5) pages).
(Continued)

*Primary Examiner* — Todd Melton
*Assistant Examiner* — Vincent Feng
(74) *Attorney, Agent, or Firm* — Crowell & Moring LLP

(57) ABSTRACT

A vehicle control device, a vehicle control method, a vehicle motion control system, and a lane estimation device according to the present invention obtain first information on lane markings defining a lane in which a vehicle travels based on external information obtained from an external recognition unit, obtain second information on a curvature of the lane based on information on a road shape obtained from a road shape information acquisition unit, obtain third information on a behavior of the vehicle based on a physical quantity that is related to a motion state of the vehicle and obtained from a vehicle motion state detection unit, and estimate lane information including information on curvatures of the lane markings and information on relative positions of the vehicle with respect to the lane markings based on the first
(Continued)

information, the second information, and the third information.

14 Claims, 14 Drawing Sheets

(51) Int. Cl.
    *B60W 40/072* (2012.01)
    *B60W 40/105* (2012.01)
    *G06V 20/56* (2022.01)
    *G06V 20/58* (2022.01)

(52) U.S. Cl.
    CPC .......... *B60W 40/105* (2013.01); *G06V 20/58* (2022.01); *G06V 20/588* (2022.01); *B60W 2420/403* (2013.01); *B60W 2520/125* (2013.01); *B60W 2520/14* (2013.01); *B60W 2552/30* (2020.02); *B60W 2552/53* (2020.02); *B60W 2554/80* (2020.02); *B60W 2556/25* (2020.02); *B60W 2710/202* (2013.01)

(58) Field of Classification Search
    USPC .......................................................... 701/41
    See application file for complete search history.

(56) References Cited

U.S. PATENT DOCUMENTS

| | | | | |
|---|---|---|---|---|
| 2013/0293717 | A1* | 11/2013 | Zhang | H04N 7/181 |
| | | | | 348/149 |
| 2019/0071080 | A1* | 3/2019 | Shimizu | G05D 1/0246 |
| 2019/0202453 | A1* | 7/2019 | Farooqi | B60W 40/112 |

FOREIGN PATENT DOCUMENTS

| | | |
|---|---|---|
| JP | 2019-38289 A | 3/2019 |
| JP | 2019-46363 A | 3/2019 |

OTHER PUBLICATIONS

International Preliminary Report on Patentability (PCT/IB/326, PCT/IB/338 & PCT/IB/373) issued in PCT Application No. PCT/JP2020/022156 dated Mar. 24, 2022, Including English translation of document C2 (Japanese-language Written Opinion (PCT/ISA/237), filed on Mar. 10, 2022) (seven (7) pages).

International Search Report (PCT/ISA/210) issued in PCT Application No. PCT/JP2020/022156 dated Aug. 18, 2020 with English translation (four (4) pages).

Japanese-language Written Opinion (PCT/ISA/237) issued in PCT Application No. PCT/JP2020/022156 dated Aug. 18, 2020 (four (4) pages).

* cited by examiner

LEFT LANE MARKING  CENTER OF LANE  RIGHT LANE MARKING

FIG.13

| No. | CONDITIONS | RELIABILITY DEGREES W OF dl AND dr |
|---|---|---|
| T-1-1 | NEAR INTERSECTION | dl: $Wtmp^2$ <br> dr: $Wtmp^2$ |
| T-1-2 | STOPPED STATE | dl: $Wtmp^2$ <br> dr: $Wtmp^2$ |
| T-1-3 | VARIATIONS OF dl, dr, α, AND κ ARE SMALL AND D IS WITHIN PREDETERMINED RANGE | dl: 1 <br> dr: 1 |
| T-1-4 | VARIATIONS OF dl AND κ ARE SMALL AND D IS WITHIN PREDETERMINED RANGE | dl: 1 <br> dr: Wtmp |
| T-1-5 | VARIATIONS OF dr AND κ ARE SMALL AND D IS WITHIN PREDETERMINED RANGE | dl: Wtmp <br> dr: 1 |
| T-1-6 | DISTANCE FROM LEADING VEHICLE IS SHORT | dl: $Wtmp^2$ <br> dr: $Wtmp^2$ |
| T-1-7 | VARIATIONS OF dl AND dr ARE LARGE | dl: $Wtmp^2$ <br> dr: $Wtmp^2$ |
| T-1-8 | OTHERS | dl: Wtmp <br> dr: Wtmp |

FIG.16

| No. | CONDITIONS | RELIABILITY DEGREE W OF a |
|---|---|---|
| T-2-1 | NEAR INTERSECTION | $W_{tmp} \times 10^{-3}$ |
| T-2-2 | STOPPED STATE | $W_{tmp} \times 10^{-3}$ |
| T-2-3 | VARIATIONS OF dl, dr, a, AND κ ARE SMALL | 1 |
| T-2-4 | DISTANCE FROM LEADING VEHICLE IS SHORT | $W_{tmp} \times 10^{-3}$ |
| T-2-5 | VARIATION OF ONE OF dl AND dr IS LARGE | $W_{tmp} \times 10^{-3}$ |
| T-2-6 | OTHERS | $W_{tmp}$ |

FIG.17

| No. | CONDITIONS | RELIABILITY DEGREE W OF κs |
|---|---|---|
| T-3-1 | MEASUREMENT LIMIT OF κs | $Wtmp \times 10^{-3}$ |
| T-3-2 | NEAR INTERSECTION | $Wtmp \times 10^{-3}$ |
| T-3-3 | STOPPED STATE | $Wtmp \times 10^{-3}$ |
| T-3-4 | DISTANCE FROM LEADING VEHICLE IS SHORT | $Wtmp \times 10^{-3}$ |
| T-3-5 | VARIATIONS OF BOTH OF dl AND dr ARE LARGE | $Wtmp \times 10^{-3}$ |
| T-3-6 | ACCURACY OF κs IS LOW | $Wtmp \times 10^{-3}$ |
| T-3-7 | OTHERS | $Wtmp$ |

FIG.18

| No. | CONDITIONS | RELIABILITY DEGREE W OF κm |
|---|---|---|
| T-4-1 | κs EXCEEDS MEASUREMENT LIMIT AND DIFFERENCE BETWEEN κs AND κd IS LARGE | $Wtmp$ |
| T-4-2 | ACCURACY OF κm IS LOW | $Wtmp \times 10^{-3}$ |
| T-4-3 | OTHERS | $Wtmp$ |

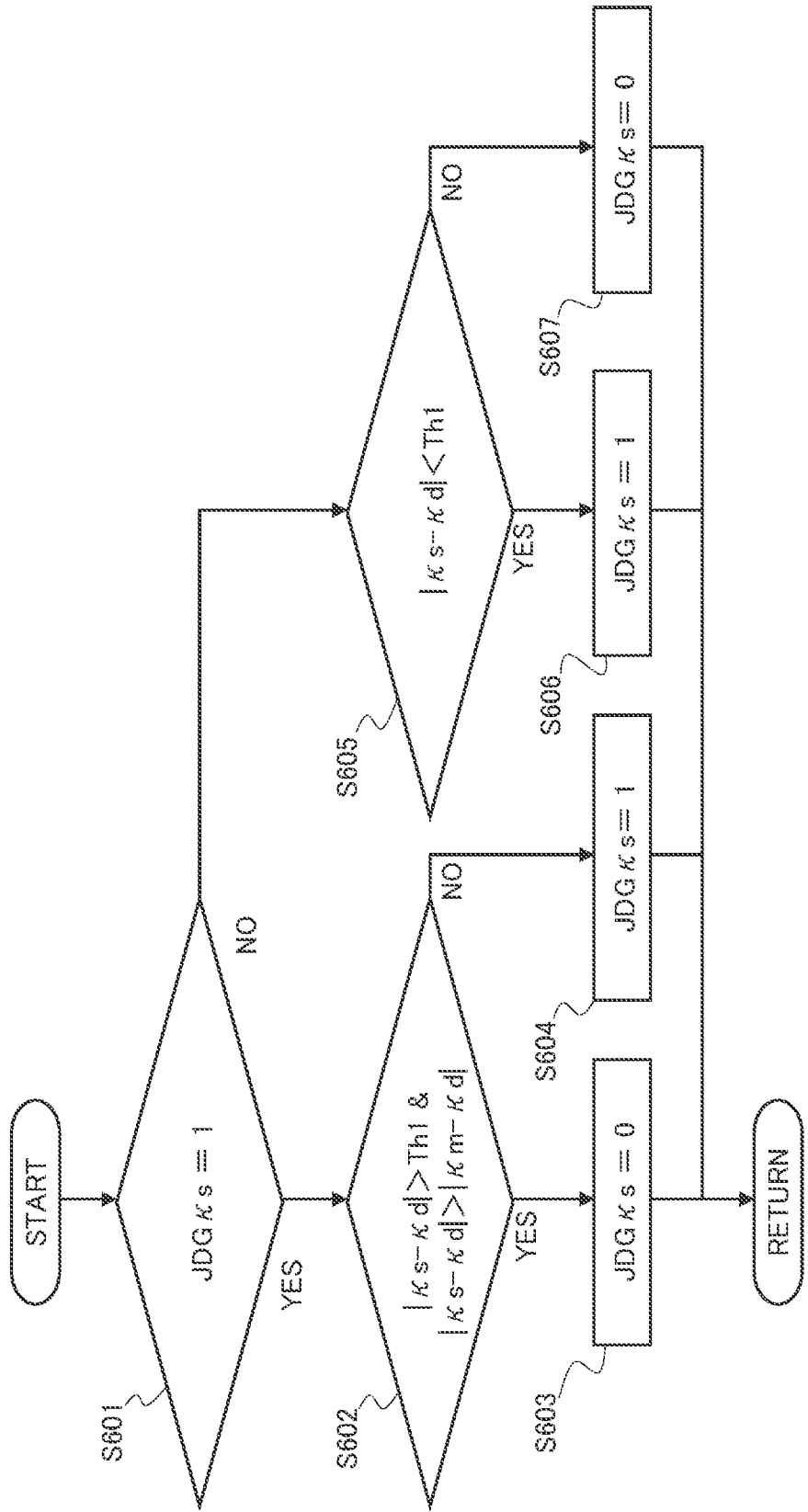

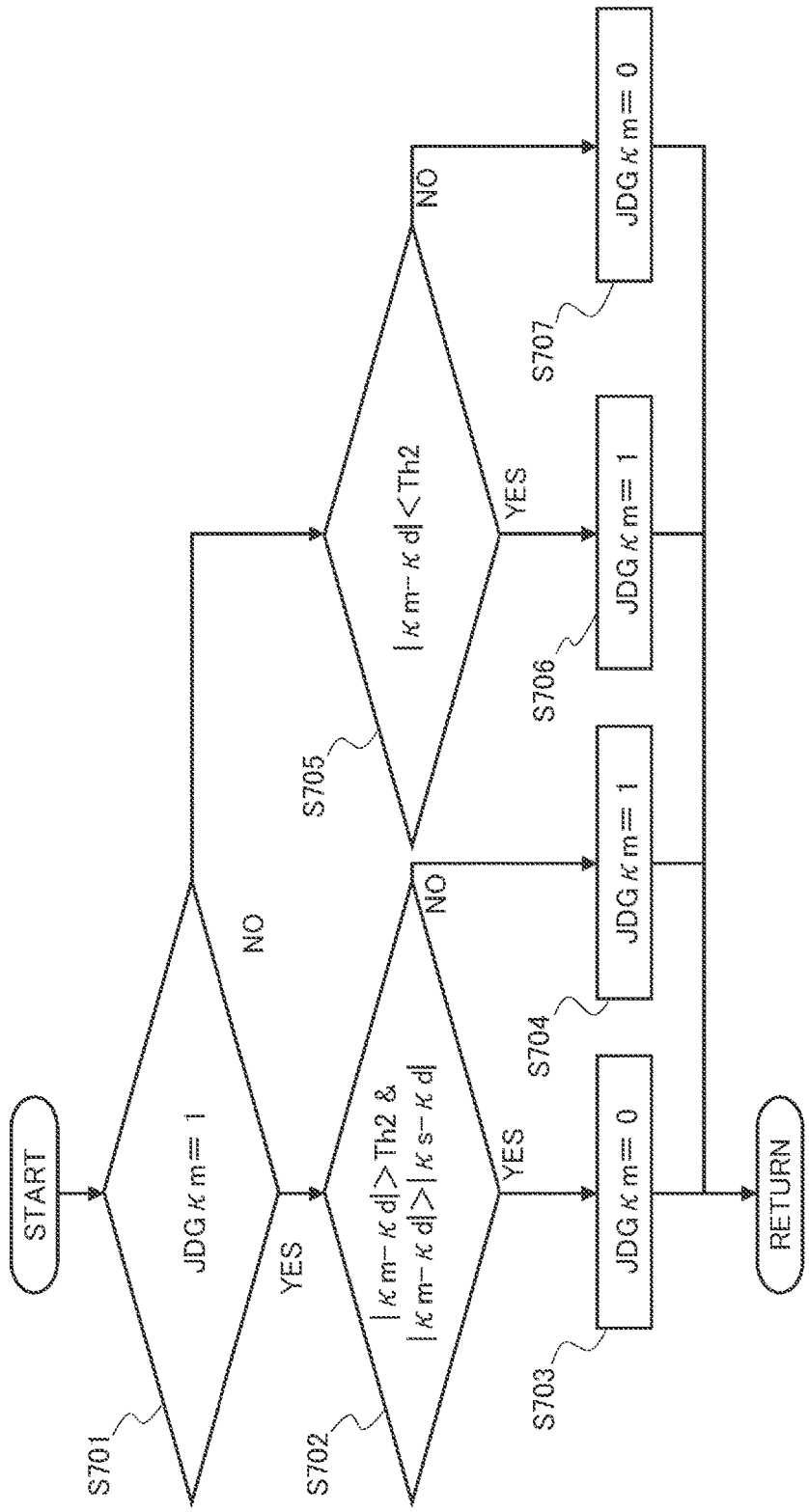

VEHICLE CONTROL DEVICE, VEHICLE CONTROL METHOD, VEHICLE MOTION CONTROL SYSTEM, AND LANE ESTIMATION DEVICE

TECHNICAL FIELD

The present invention relates to a vehicle control device, a vehicle control method, a vehicle motion control system, and a lane estimation device.

BACKGROUND ART

A driver assistance device in Patent Document 1 includes an image acquisition unit that obtains an image captured by an in-vehicle camera, a lane marking recognition unit that recognizes lane markings defining a lane in which a vehicle travels based on the captured image, a road information acquisition unit that obtains road information, a reliability setting unit that sets reliability degrees of the lane markings recognized by the lane marking recognition unit based on the road information, and a driver assistance unit that performs driver assistance for the vehicle based on the recognized lane markings and varies control methods in the driver assistance according to the reliability degrees.

REFERENCE DOCUMENT LIST

Patent Document

Patent Document 1 JP 2019-046363A

SUMMARY OF THE INVENTION

Problem to be Solved by the Invention

Here, in a system for performing a lane keeping control based on information on lane markings obtained from an image captured by an in-vehicle camera, it has been difficult to stably recognize the lane markings with high accuracy and it has been difficult to continue the lane keeping control in a place such as an intersection where no lane marking exists.

The present invention is made in view of the state of the related art, and its object is to provide a vehicle control device, a vehicle control method, a vehicle motion control system, and a lane estimation device with improved lane-marking recognition performance.

Means for Solving the Problem

According to an aspect of the present invention, first information on lane markings defining a lane in which a vehicle travels is obtained based on external information obtained from an external recognition unit, second information on a curvature of the lane is obtained based on information on a road shape obtained from a road shape information acquisition unit, third information on behavior of the vehicle is obtained based on a physical quantity that is related to a motion state of the vehicle and obtained from a vehicle motion state detection unit, and lane information including information on curvatures of the lane markings and information on relative positions of the vehicle with respect to the lane markings is obtained based on the first information, the second information, and the third information.

Effects of the Invention

The present invention makes it possible to improve lane-marking recognition performance and thereby improve lane-keeping-control performance.

BRIEF DESCRIPTION OF THE DRAWINGS

FIG. 13 is a drawing indicating methods of correcting reliability degrees W of left and right lane marking positions dl and dr;

FIG. 16 is a drawing indicating a method of correcting a reliability degree W of a yaw angle α;

FIG. 17 is a drawing indicating a method of correcting a reliability degree W of a curvature κs measured using an external recognition sensor;

FIG. 18 is a drawing indicating a method of correcting a reliability degree W of a curvature κm obtained from map information;

FIG. 19 is a flowchart illustrating a process of determining the accuracy of a curvature κs; and FIG. 20 is a flowchart illustrating a process of determining the accuracy of a curvature κm.

MODE FOR CARRYING OUT THE INVENTION

Embodiments of a vehicle control device, a vehicle control method, a vehicle motion control system, and a lane estimation device according to the present invention are described below with reference to the drawings.

Figure 1:
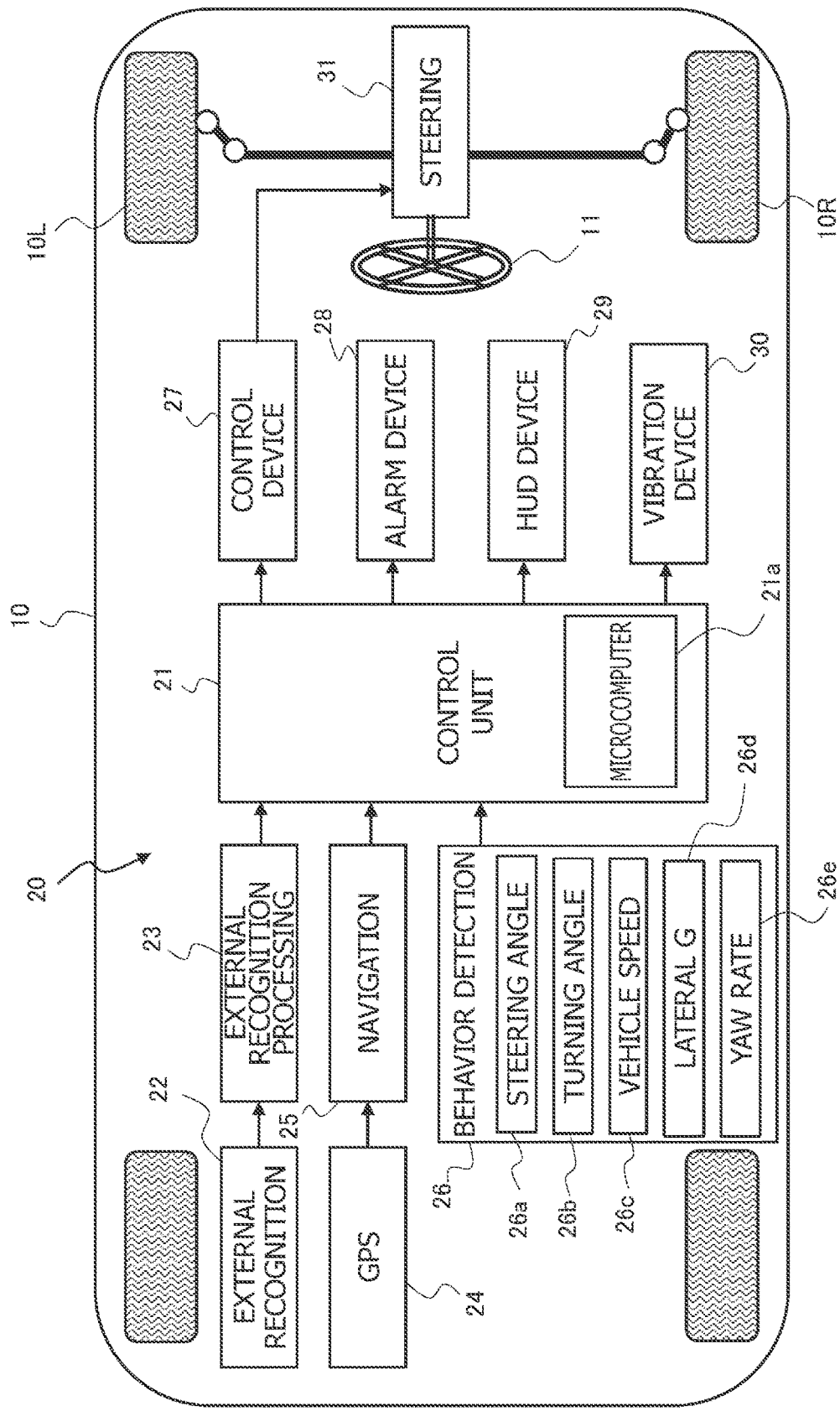
FIG. 1 is a block diagram illustrating a configuration of a vehicle motion control system.

FIG. 1 is a system block diagram illustrating an embodiment of a vehicle motion control system 20 included in a vehicle (automobile) 10.

Vehicle motion control system 20 includes at least one of an automatic driving mode in which a steering control, in other words, a lane keeping control, is performed such that vehicle 10 travels along a driving lane without involving the operation of a steering wheel 11 by a driver and a driver assistance mode in which the driver is notified that vehicle 10 is about to depart from the driving lane.

Here, the automatic driving mode may be configured such that a vehicle speed control is performed along with the steering control described above.

Vehicle motion control system 20 includes a control unit 21 as an example of a vehicle control device.

Control unit 21 is an electronic control device mainly comprised of a microcomputer 21a that includes a processor, a memory, an I/O unit, and a bus connecting these components. Microcomputer 21a functions as a controller that performs a vehicle control including the steering control by performing calculations based on input information and outputting control commands as the calculation results.

An external recognition sensor 22 measures a scene in front of vehicle 10 (own vehicle), detects lane markings (e.g., white lines or yellow lines) drawn on the road to define the right and left of a lane in which vehicle 10 is traveling and an object existing in front of vehicle 10, and measures relative distances from vehicle 10 to the lane markings and a relative distance from vehicle 10 to the object.

External recognition sensor 22 may be implemented by a sensor such as a stereo camera or a LiDAR (Light Detection and Ranging, Laser Imaging Detection and Ranging) sensor that can measure both the shape of an object in front of the vehicle and the distance from vehicle 10 to the object.

Also, external recognition sensor 22 may be implemented by combining multiple sensors such as a monocular camera, a millimeter-wave radar, and an ultrasonic sensor that can measure either the shape of an object in front of the vehicle or the distance to the object.

Based on information on the lane markings detected by external recognition sensor 22, an external recognition processing device 23 calculates relative distances between vehicle 10 and the right and left lane markings, a yaw angle of vehicle 10, and curvatures of the lane markings corresponding to the curvature of the lane (in other words, a travel route).

Furthermore, external recognition processing device 23 recognizes a leading vehicle traveling in front of vehicle 10 based on the information on the object in front of vehicle 10 detected by external recognition sensor 22, and calculates a relative distance between vehicle 10 and the leading vehicle.

External recognition sensor 22 and external recognition processing device 23 described above constitute an external recognition unit that recognizes external information of vehicle 10.

Also, the information on the relative distances between vehicle 10 and the right and left lane markings, the yaw angle, and the curvatures of the lane markings calculated by external recognition processing device 23 is information on lane markings. In the present application, the information on lane markings obtained using external recognition sensor 22 is referred to as first information.

A global positioning system (GPS) 24 measures positional relationships between vehicle 10 and multiple GPS satellites, and calculates a latitude and a longitude indicating a current location of vehicle 10 and a directional angle of vehicle 10 based on the measurement results.

Based on information on the current location of vehicle 10 obtained from GPS 24 and map information, a navigation system 25 displays, on an accompanying liquid-crystal display, a map screen in which a marker indicating the current location of vehicle 10 is superimposed on a road map around vehicle 10.

Also, navigation system 25 searches for the optimum guidance route from the current location to a destination specified by the driver, superimposes the guidance route on the map screen, and provides guidance such as a course change to the driver by, for example, displaying branch information on the map screen or providing spoken information (in other words, sound).

Control unit 21 can obtain information on the shape of a road on which vehicle 10 is traveling by using navigation system 25. Navigation system 25 corresponds to a road shape information acquisition unit that obtains information on a road shape.

Also, as described below, control unit 21 calculates information on the curvature of a lane based on the information on the road shape obtained from navigation system 25.

In the present application, the information on the curvature of a lane based on the information on the road shape obtained by navigation system 25 is referred to as second information.

A vehicle behavior detection device 26 includes multiple sensors that detect physical quantities related to the motion state of vehicle 10.

As multiple sensors constituting vehicle behavior detection device 26, vehicle motion control system 20 includes a steering angle sensor 26a for detecting the steering angle of steering wheel 11, a turning angle sensor 26b for detecting the turning angle of front wheels 10FL and 10FR that are turning wheels of vehicle 10, a vehicle speed sensor 26c for detecting a vehicle speed that is the traveling speed of vehicle 10, a lateral G sensor 26d for detecting the lateral acceleration of vehicle 10, and a yaw rate sensor 26e for detecting the yaw rate of vehicle 10.

In other words, vehicle behavior detection device 26 corresponds to a vehicle motion state detection unit that detects physical quantities related to the motion state of vehicle 10.

The vehicle speed, the lateral acceleration, and the yaw rate detected by vehicle behavior detection device 26 are information on the behavior of vehicle 10. In the present application, the information on the behavior of vehicle 10 is referred to as third information.

Based on information (first information, second information, and third information) obtained from external recognition processing device 23, navigation system 25, and vehicle behavior detection device 26, control unit 21 estimates lane information that includes information on the curvatures of lane markings and information on the relative positions of vehicle 10 with respect to the lane markings.

That is, control unit 21 includes a function as a lane estimation device that estimates the lane information.

In the automatic driving mode, control unit 21 calculates a target steering angle for causing vehicle 10 to travel along a driving lane based on estimated lane information, and sends a signal (in other words, a steering angle command) indicating the calculated target steering angle to a steering control device 27.

The function for controlling the steering angle based on the lane information corresponds to the lane keeping control.

Also, in the driver assistance mode, control unit 21 determines whether vehicle 10 is about to depart from the driving lane based on the estimated lane information; and when vehicle 10 is about to depart from the driving lane, control unit 21 performs a lane departure warning control to warn the driver of the lane departure.

Here, the driver can turn the automatic driving mode and the driver assistance mode on and off by, for example, operating switches.

Vehicle motion control system 20 includes an alarm device 28, a head-up display (HUD) device 29, and a steering vibration device 30.

Control unit 21 warns the driver of the lane departure by one or more of the following methods: generating a voice or an alarm sound using alarm device 28, displaying a warning message on head-up display (HUD) device 29, vibrating steering wheel 11 using steering vibration device 30, and applying torque to steering wheel 11 in a direction to return to the lane.

Alarm device 28 provides various warnings by generating speech and alarm sounds.

HUD device 29 displays images in the field of vision of the driver who is looking ahead. For example, HUD device 29 displays guidance provided by navigation system 25 and various warnings.

Steering vibration device 30 provides various warnings by vibrating steering wheel 11.

A steering device 31 includes a steering actuator such as a motor that generates steering force. Steering device 31 assists the driver in operating steering wheel 11 by using the steering actuator, and also enables automatic steering of front wheels 10FL and 10FR with the steering actuator.

Steering control device 27 calculates steering torque for achieving a target steering angle instructed by control unit 21, and causes the steering actuator of steering device 31 to generate the steering torque.

Here, control unit 21 can calculate the steering torque for achieving the target steering angle and output a steering torque command as a control command for steering.

Next, a lane information estimation process performed by control unit 21 is described in detail.

Figure 2:
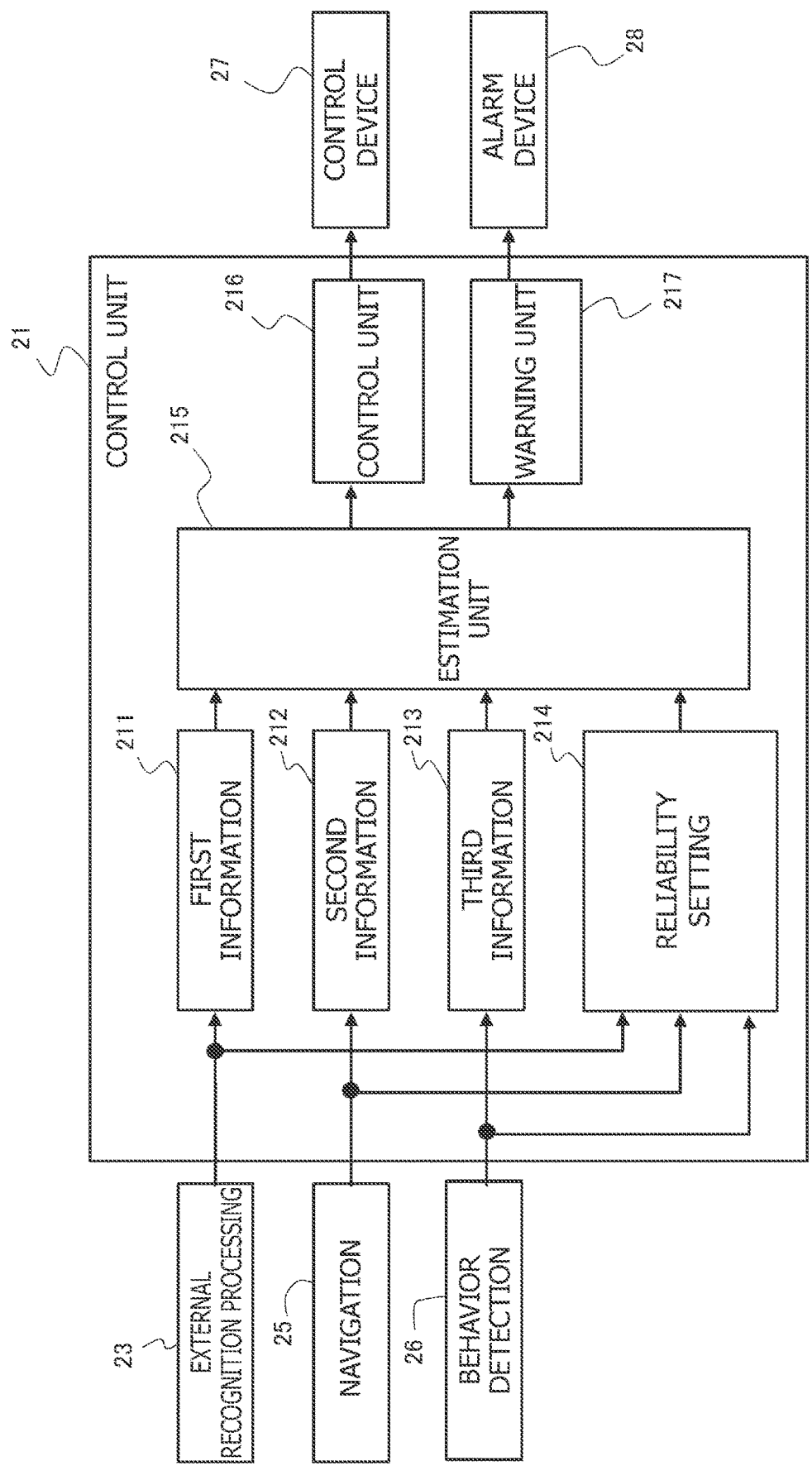
FIG. 2 is a functional block diagram of a control unit (in other words, a vehicle control device or a lane estimation device) constituting a vehicle motion control system.

FIG. 2 is a block diagram illustrating a lane information estimation function of control unit 21 (microcomputer 21a).

A first information acquisition unit 211 obtains first information, which is information regarding lane markings, by using external recognition processing device 23.

A second information acquisition unit 212 obtains second information, which is information regarding the curvature of a lane, by using navigation system 25.

A third information acquisition unit 213 obtains third information, which is information regarding the behavior of vehicle 10, by using vehicle behavior detection device 26.

A reliability setting unit 214 sets reliability degrees used to weight the first information, the second information, and the third information based on information from external recognition processing device 23, navigation system 25, and vehicle behavior detection device 26.

Based on the first information, the second information, the third information, and the reliability degrees set by reliability setting unit 214, a lane estimation unit 215 estimates lane information that includes information on the curvatures of lane markings and information on the relative positions of vehicle 10 with respect to the lane markings.

A lane keeping control unit 216 calculates a target steering angle for causing vehicle 10 to travel along the driving lane based on the lane information estimated by lane estimation unit 215. Then, lane keeping control unit 216 sends a signal indicating the calculated target steering angle to steering control device 27.

In other words, based on the lane information, lane keeping control unit 216 outputs a steering control command to perform a lane keeping control for vehicle 10.

Also, based on the lane information estimated by the lane estimation unit 215, a lane departure warning unit 217 determines whether vehicle 10 is about to depart from the driving lane.

Then, when vehicle 10 is about to depart from the driving lane, lane departure warning unit 217 outputs an alarm generation command to, for example, alarm device 28 to notify the lane departure to the driver.

Figure 3:
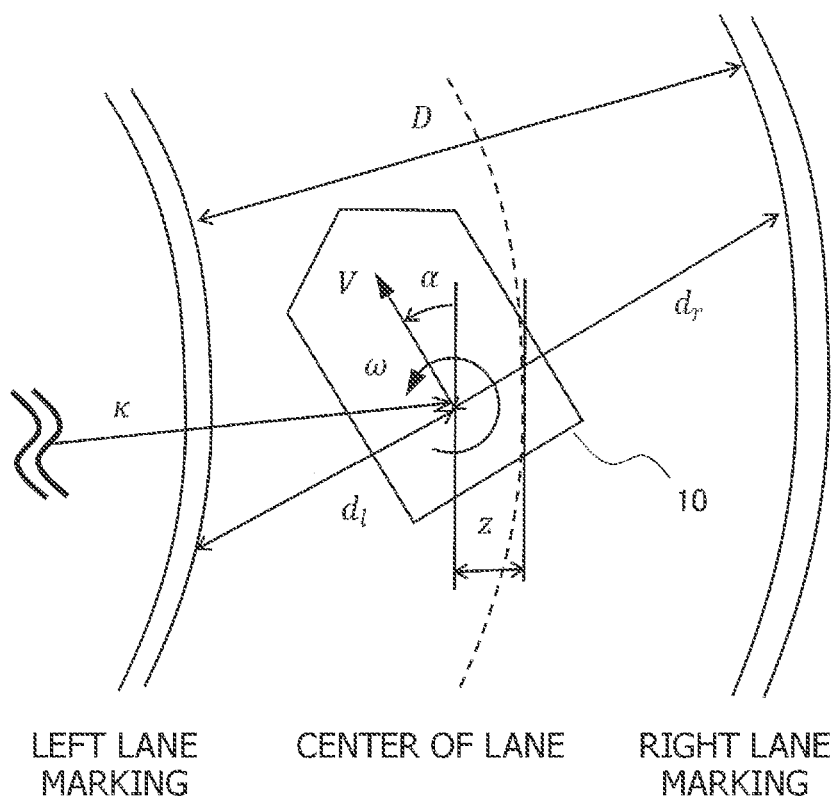
FIG. 3 is a drawing illustrating symbols of various variables in an embodiment.

FIG. 3 illustrates symbols of various variables used in the present embodiment.

In the present embodiment, the distance between vehicle 10 and the left lane marking is represented by dl [m], the distance between vehicle 10 and the right lane marking is represented by dr [m], the yaw angle of vehicle 10 is represented by a [rad], the curvature of a lane (travel route) is represented by κ [1/m], the road width (the distance between the right lane marking and the left lane marking) is represented by D [m], the vehicle speed is represented by V [m/s], the yaw rate is represented by ω [rad/s], and the lateral position indicating the amount of lateral shift of vehicle 10 from the center of the lane is represented by z [m].

In the descriptions below, the distance dl is referred to as a left lane marking position dl, and the distance dr is referred to as a right lane marking position dr. The left lane marking position dl and the right lane marking position dr are information regarding the relative positions of vehicle 10 with respect to the lane markings.

Also, the curvature κ of a travel route based on the lane markings recognized by external recognition sensor 22 is represented by κs, and the curvature κ of a travel route based on the shape of a road, which is obtained by navigation system 25 and on which vehicle 10 is traveling, is represented by κm.

Figure 4:
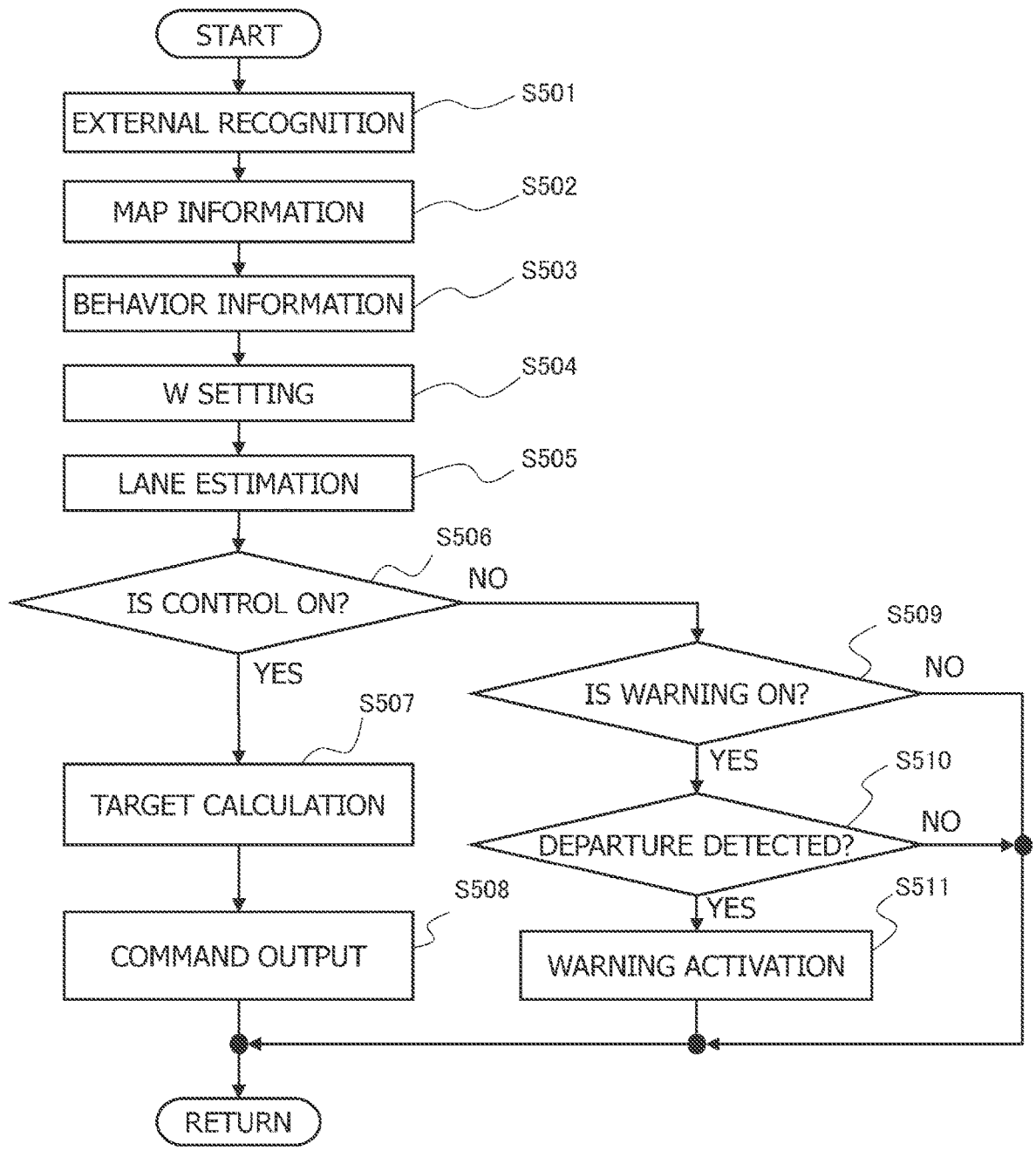
FIG. 4 is a flowchart illustrating a lane keeping control process and a lane departure warning control process.

FIG. 4 is a flowchart illustrating a lane keeping control process and a lane departure warning control process performed by control unit 21.

Here, microcomputer 21a of control unit 21 executes the routine illustrated by the flowchart of FIG. 4 at regular intervals of, for example, 50 ms by interrupt processing.

At step S501 (first information acquisition unit 211), control unit 21 obtains, as first information, lane marking information that includes the left lane marking position dl, the right lane marking position dr, the yaw angle α, and the curvature κs by using external recognition processing device 23.

Next, at step S502 (second information acquisition unit 212), control unit 21 calculates the curvature κm of a road at the current location of vehicle 10 based on information that is regarding the road shape at the current location of vehicle 10 and obtained from navigation system 25, and also calculates a change amount C [1/m/m] of the curvature κm.

The curvature κm and the change amount C are second information regarding the curvature of a lane.

Here, the change amount C is a change amount of the curvature κm per unit travel distance of vehicle 10.

When the travel distance of vehicle 10 is s, the change amount C is a value that satisfies Formula 1.

$$\frac{d}{ds}\kappa = C \quad \text{[Formula 1]}$$

In Formula 1, d/ds is a derivative value with respect to the travel distance s of vehicle 10.

When, for example, a road network in map information is represented by nodes and links, control unit 21 can calculate the curvature κm as the reciprocal of the radius of a circle that passes through three nodes close to the current location of vehicle 10.

Also, control unit 21 can calculate an approximate curve indicating the relationship of the curvature κm with the travel distance s by using the curvature κm calculated based on multiple nodes around the current location of vehicle 10 and the distances between the nodes, and calculate the slope of the approximate curve at the current location of vehicle 10 as the change amount C.

In this process, control unit 21 can store the curvature κm calculated at each time point, and calculate the approximate curve with the travel distance s corrected using the amount of movement of vehicle 10.

As described above, control unit 21 can calculate the curvature κm using map information in which road shapes are represented with nodes and links.

Accordingly, a map in which road shapes are represented with nodes and links is sufficient for navigation system 25, and it is not necessary to use a so-called high-precision map including information such as lanes and road signs.

Also, instead of using the map information included in navigation system 25, control unit 21 can generate a local map (e.g., a road network map) of an area around vehicle 10 based on surrounding environments such as curbs measured using, for example, a LiDAR.

Then, control unit 21 can calculate the curvature κm and the change amount C as the second information based on the generated map information.

That is, the road shape information acquisition unit is not limited to navigation system 25, and control unit 21 can obtain road shapes using a sensor such as a LiDAR that is provided separately from external recognition sensor 22.

The road shape information obtained by control unit 21 from, for example, navigation system 25 is information regarding the shape of a road that includes the outside of lane markings and on which vehicle 10 can travel and is information regarding the shape of a road of which a boundary is defined by, for example, a guardrail or a curb outside of the lane markings.

Also, control unit 21 can use a curvature radius 1/κ instead of the curvature κ as a quantity indicating the degree of curvature of a lane (road).

However, because the curvature radius of a straight path is infinite and is difficult to use as data in arithmetic processing by microcomputer 21a, control unit 21 of the present embodiment uses the curvature κ.

Next, at step S503 (third information acquisition unit 213), control unit 21 obtains information on the vehicle speed V and the yaw rate ω of vehicle 10 from vehicle behavior detection device 26 as the third information regarding the behavior of vehicle 10.

Then, at next step S504 (reliability setting unit 214), control unit 21 sets a reliability degree W (in other words, a weight) for the information obtained at each of step S501 (first information acquisition unit 211), step S502 (second information acquisition unit 212), and step S503 (third information acquisition unit 213).

Here, the reliability degree W is an index value of the accuracy of information. A process of calculating the reliability degree W by control unit 21 is described later in detail.

Control unit 21 then proceeds to step S505 (lane estimation unit 215) and estimates lane information including the lateral position z, the yaw angle α, the road width D, and the curvature κ.

Here, control unit 21 weights the first information obtained at step S501 (first information acquisition unit 211), the second information obtained at step S502 (second information acquisition unit 212), and the third information obtained at step S503 (third information acquisition unit 213) based on the reliability degrees W set at step S504 (reliability setting unit 214), and performs state estimation calculations to calculate estimated values of the lateral position z, the yaw angle α, the road width D, and the curvature κ as the lane information.

The process of calculating the lane information is described later in detail.

As described above, control unit 21 estimates lane information based on the second information obtained from navigation system 25 and the third information regarding the behavior of vehicle 10 in addition to the first information obtained from external recognition sensor 22. This makes it possible to improve the performance of recognizing lane markings and improve the performance of the lane keeping control.

For example, even in an intersection where no lane marking exists, control unit 21 can estimate a lane in which vehicle 10 needs to travel and continue the lane keeping control. This in turn makes it possible to increase areas in which the lane keeping control can be performed.

Furthermore, control unit 21 performs weighting based on reliability degrees W of information items used in the estimation of lane information. This makes it possible to reduce the influence of information with a large error on the estimation result, and makes it possible to incorporate accurate information in the estimation of lane information and thereby improve the accuracy of lane information.

Next, control unit 21 proceeds to step S506 to determine whether the lane keeping control is in the ON state, in other words, whether the driver of vehicle 10 has selected the automatic driving mode so that the lane keeping control is performed.

When the lane keeping control is in the ON state, i.e., the automatic driving mode is selected, control unit 21 proceeds to step S507; and when the lane keeping control is in the OFF state, control unit 21 proceeds to step S509.

When the lane keeping control is in the ON state and the process proceeds to step S507, control unit 21 calculates a target steering amount (in other words, a steering control command) necessary for vehicle 10 to travel along the driving lane based on the lane information obtained at step S505 (lane estimation unit 215).

Next, control unit 21 proceeds to step S508 to output a control command indicating the target steering amount (in other words, a target steering angle) obtained at step S507 to steering control device 27, and then ends the control cycle.

Steering control device 27 controls the steering actuator of steering device 31 to achieve the target steering amount instructed by control unit 21.

On the other hand, when the lane keeping control is in the OFF state and the process proceeds to step S509, control unit 21 determines whether the lane departure warning control is in the ON state, in other words, whether the driver of vehicle 10 has selected the driver assistance mode so that the lane departure warning control is performed.

When the lane departure warning control is in the ON state, i.e., the driver assistance mode is selected, control unit 21 proceeds to step S510. In contrast, when the lane departure warning control is in the OFF state and neither the automatic driving mode nor the driver assistance mode is selected, control unit 21 ends the control cycle.

When the lane departure warning control is in the ON state, i.e., the driver assistance mode is selected and the process proceeds to step S510, control unit 21 determines whether vehicle 10 is about to depart from the driving lane based on the lane information obtained at step S505 (lane estimation unit 215).

When vehicle 10 is about to depart from the driving lane, control unit 21 proceeds to step S511 and outputs an activation command to alarm device 28.

That is, control unit 21 warns the driver of vehicle 10 that vehicle 10 is about to depart from the driving lane by activating, for example, alarm device 28, HUD device 29, and/or steering vibration device 30 and then ends the control cycle.

On the other hand, when vehicle 10 is traveling along the driving lane and vehicle 10 is not about to depart from the driving lane, control unit 21 does not have to warn the driver and therefore ends the control cycle without activating alarm device 28.

Here, in the process illustrated by the flowchart of FIG. 4, it is assumed that the system is configured such that only one of the lane keeping control and the lane departure warning control is activated.

However, the system may be configured such that both of the lane keeping control and the lane departure warning control are performed concurrently. For example, even while the lane keeping control is being performed, the lane departure warning may be activated when vehicle 10 is about to depart from the driving lane.

Next, lane estimation unit 215, in other words, the process at step S505 of FIG. 4, is described in detail.

As indicated by Formula 2, Formula 3, and Formula 4 below, lane estimation unit 215 estimates a state x [k] (state estimated values) including the lateral position z, the yaw angle α, the road width D, and the curvature κ by using an output y [k] (observed values) including the left lane marking position dl, the right lane marking position dr, the yaw angle α, the curvature Ks, and the curvature κm and an input u [k] (control input values) including the vehicle speed V, the yaw rate ω, and the curvature change amount C.

$$x[k]=[z[k]\,\alpha[k]\,\kappa[k]\,D[k]]^T \quad \text{[Formula 2]}$$

$$u[k]=[V[k]\,\omega[k]\,C[k]]^T \quad \text{[Formula 3]}$$

$$y[k]=[dl[k]\,dr[k]\,\alpha[k]\,\kappa_s[k]\,\kappa_m[k]]^T \quad \text{[Formula 4]}$$

Here, x, u, and y indicate a state vector (state estimated values), an input vector (control input values), and an output vector (observed values), and T is a symbol representing a transpose matrix.

In this case, state equations indicating the dynamics of the system can be expressed by Formulas 5 and 6, and observation equations expressing the output vector using the state vector can be expressed by Formulas 7 and 8.

$$x[k+1] = f(x[k], u[k]) + v[k] \quad \text{[Formula 5]}$$

$$f(x[k], u[k]) = x[k] + \begin{bmatrix} V[k]\sin\alpha[k] \\ \dfrac{V[k]\kappa_s[k]}{1+z[k]\kappa_s[k]}\cos\alpha[k]-\omega[k] \\ 0 \\ (V[k]\cos\alpha[k])C[k] \end{bmatrix} \Delta t \quad \text{[Formula 6]}$$

$$y[k] = h(x[k]) + w[k] \quad \text{[Formula 7]}$$

$$h(x[k]) = \begin{bmatrix} \left(z[k] + \dfrac{D[k]}{2}\right)\cos\alpha[k] \\ \left(z[k] - \dfrac{D[k]}{2}\right)\cos\alpha[k] \\ \alpha[k] \\ \kappa[k] \\ \kappa[k] \end{bmatrix} \quad \text{[Formula 8]}$$

Here, Δt represents the time between samplings (in other words, a sampling period), and v and w represent the system noise of a mean zero and covariance matrix Q and the observed noise of a mean zero and covariance matrix R, respectively.

Also, an evaluation function J represented by Formula 9 is set as an indicator of the accuracy of state estimation.

$$\begin{aligned} J = &\sum_{k=T-H}^{T-1} (\hat{x}[k+1] - f(\hat{x}[k], u[k]))^T S_Q (\hat{x}[k+1] - f(\hat{x}[k], u[k])) + \\ &\sum_{k=T-H}^{T} (y[k] - h(\hat{x}[k]))^T S_R (y[k] - h(\hat{x}[k])) + \\ &\left(\hat{x}[T-H] - \hat{x}^-[T-H]\right)^T S_P \left(\hat{x}[T-H] - \hat{x}^-[T-H]\right) \end{aligned} \quad \text{[Formula 9]}$$

In this Formula, T indicates a current sampling, H indicates an evaluation period length, in other words, the number of samplings to be included in the evaluation function J, and $S_Q$, $S_R$, and $S_P$ represent weighting matrices.

Also, (x with a hat "^") indicates an estimated value (estimated state) of the state x, and x^ with the superscript of "-" indicates an estimated value in the previous sampling.

A method in which the evaluation function J represented by Formula 9 above is used in the optimization calculation to obtain a state estimated value that minimizes the value of the evaluation function J, is called moving horizon estimation (MHE).

The first term on the right-hand side of Formula 9 is a term to make the change amount of the state estimated value between samplings match the equation of state represented by Formula 6, and minimizing this term makes it possible to perform state estimation that conforms to the system dynamics.

Also, the second term on the right side of Formula 9 is a term to make the relationship between a state estimated value and an observed value in each sampling match the observation equation of Formula 8, and minimizing this term makes it possible to perform state estimation corresponding to the observed value.

The third term on the right-hand side of Formula 9 is a term for evaluating the amount of change from the state estimated value obtained in the previous sampling, and minimizing this term makes it possible to incorporate information earlier than the evaluation period length into the estimation.

Also, the degrees of influence of the terms on the right-hand side of Formula 9 on the state estimation are determined by the weighting matrices $S_Q$, $S_R$ and $S_P$.

In general moving horizon estimation, the inverse matrices of covariance matrices of system noise and observed noise are used as the weighting matrices $S_Q$ and $S_R$, and the inverse matrix of an error covariance matrix of an estimated state obtained when an extended Kalman filter is applied to the system represented by Formulas 5 through 8 is used as the weighting matrix $S_P$.

In this case, because the observed noise is assumed to follow a normal distribution, if an observed value (hereafter referred to as an outlier) not following the normal distribution and deviating significantly from the true value occurs, the outlier may affect the estimated value and cause the estimated value to deviate significantly from the true value.

Therefore, when observed values (in other words, measured values) including the left lane marking position dl, the right lane marking position dr, the yaw angle α, the curvature $\kappa_s$, and the curvature κm are likely to be outliers, control unit 21 (lane estimation unit 215) performs state estimation such that the influence of the outliers is reduced by decreasing the weights of the observed values.

Figure 5:
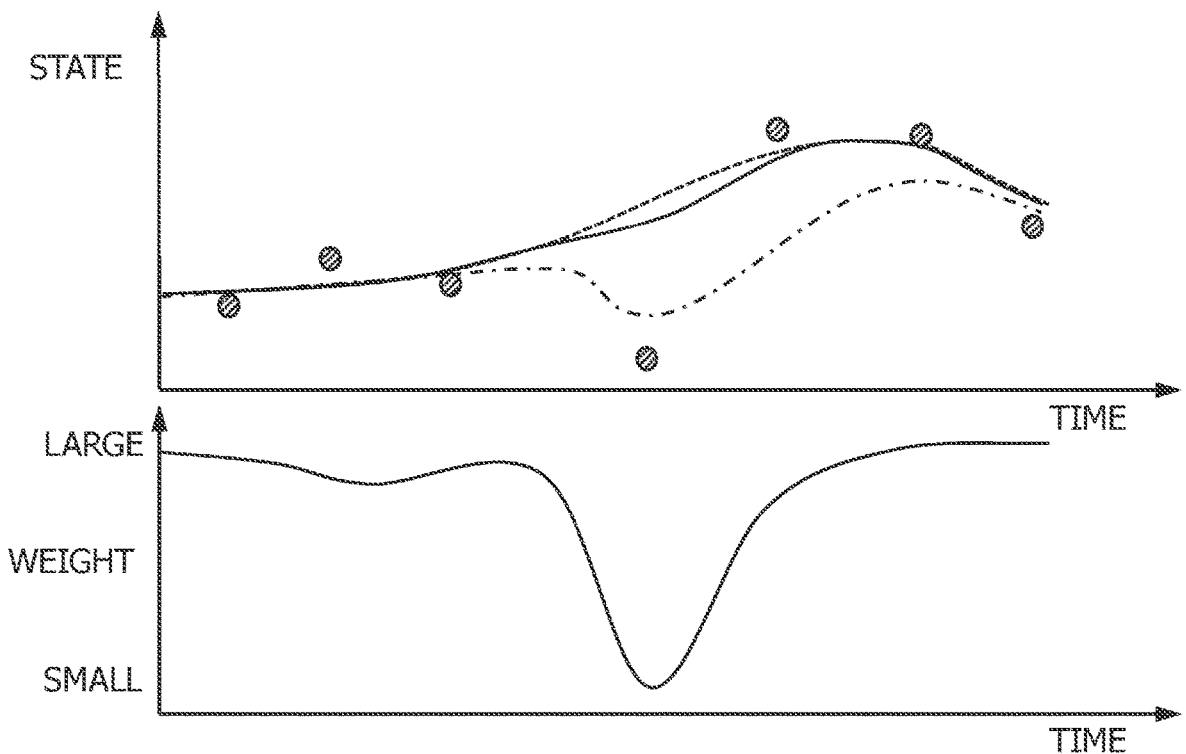
FIG. 5 is a time chart indicating the influence of an outlier on an estimated value.

FIG. 5 illustrates the correlation among an observed value, an estimated value, and the weight of the observed value.

In FIG. 5, a dashed-dotted line indicates an estimated value obtained when state estimation is performed without considering any outlier, and a solid line indicates an estimated value obtained when state estimation is performed by decreasing the weight of the outlier. Also, a dotted line indicates the true value, and circles indicate measured values.

As indicated by FIG. 5, when state estimation is performed without considering any outlier, the estimated value deviates significantly from the true value due to the influence of the outlier. On the other hand, when the weight of the outlier is decreased, the influence of the outlier can be reduced, and the estimated value becomes close to the true value.

Lane estimation unit 215 calculates the weighting matrix $S_R$ for the second term on the right side of Formula 9 based on Formula 10 using a reliability degree W calculated by reliability setting unit 214.

$$S_R = R^{-1}W \quad \text{[Formula 10]}$$

Here, control unit 21 can also change the weighting matrix $S_Q$ for the first term on the right-hand side of Formula 9 according to the reliability degree W.

However, because the degrees of influence of the terms on the right side of Formula 9 on state estimation are determined by the ratio of the weights of the terms, decreasing both of the weight of the first term and the weight of the second term may result in an estimation result that is not significantly different from an estimation result obtained without changing the weights.

For this reason, control unit 21 changes only the weighting matrix $S_R$ for the second term on the right side of Formula 9 according to the reliability degree W.

The process of calculating the reliability degree W by control unit 21 (reliability setting unit 214) is described later.

Figure 6:
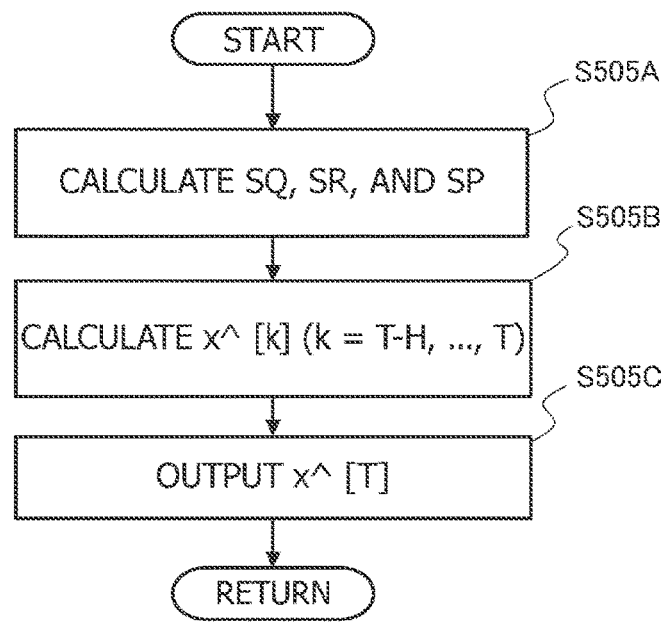
FIG. 6 is a flowchart illustrating a lane estimation process.

FIG. 6 is a flowchart illustrating the process at step S505 (lane estimation unit 215) of the flowchart of FIG. 4.

First, at step S505A, control unit 21 calculates the weighting matrices $S_Q$, $S_R$, and $S_P$ for the terms on the right side of Formula 9.

Here, control unit 21 calculates the weighting matrix $S_R$ for the second term on the right side of Formula 9 based on Formula 10 using the reliability degree W.

Also, control unit 21 sets the weighting matrix $S_Q$ for the first term on the right-hand side of Formula 9 to $S_Q = Q^{-1}$, and sets the weighting matrix $S_P$ for the third term on the right-hand side of Formula 9 to the inverse of the error covariance matrix of an estimated state obtained when the extended Kalman filter is applied to the system represented by Formulas 5 through 8.

Next, control unit 21 proceeds to step S505B and solves a nonlinear programming problem for calculating an estimated value $\hat{x}[k]$ (k=T−H, . . . , T) of the state x that minimizes the value of the evaluation function J represented by Formula 9.

Control unit 21 can use a known solution method such as sequential quadratic programming or an interior point method to solve the nonlinear programming problem described above. Using the sequential quadratic programming makes it possible to obtain the solution at a relatively high speed.

Then, at step S505C, control unit 21 outputs the estimated value $\hat{x}[T]$ of the current time among the estimated values $\hat{x}[k]$ (k=T−H, . . . , T).

Here, control unit 21 can impose a predetermined constraint as described later on the calculation (lane information estimation) of the estimated value $\hat{x}[k]$.

Next, the effect of changing weights according to the reliability degrees W is described using a simple numerical example.

In the descriptions below, to clearly explain the effect of changing the weights according to the reliability degrees W, the function represented by Formula 11 is used as the evaluation function J.

$$J = (y-4)^2 + w(y-8)^2 \quad \text{[Formula 11]}$$

In the evaluation function J represented by Formula 11, two observed values, i.e., observed value=4 and observed value=8, are obtained for a variable y to be estimated.

Here, minimizing the value of the evaluation function J represented by Formula 11 is equivalent to estimating the variable y after performing weighting with a coefficient w to indicate which one of the two observed values is to be trusted.

Here, it is assumed that observed value=8 is known to be an outlier.

Figure 7:
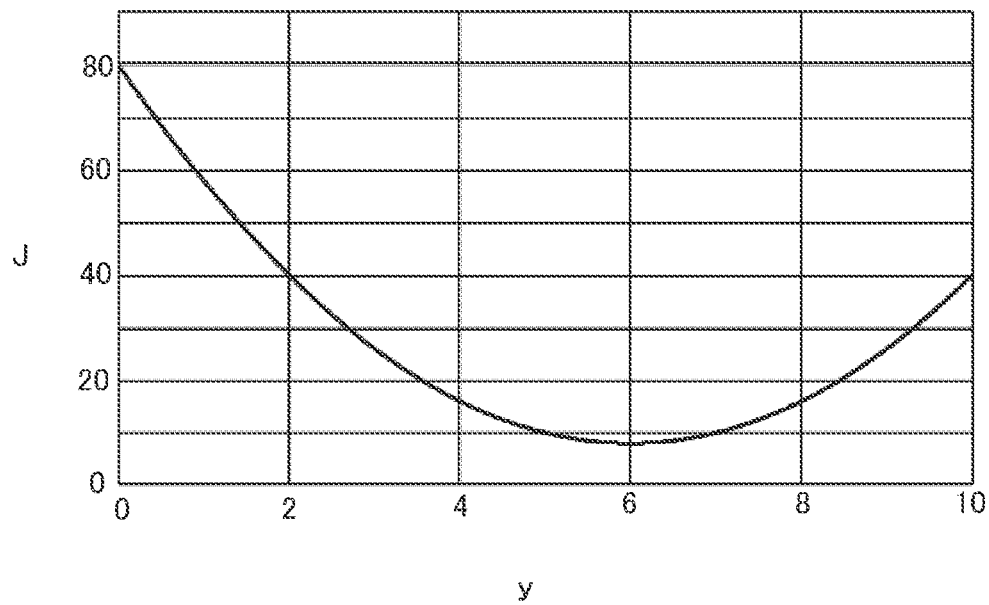
FIG. 7 is a graph indicating the value of an evaluation function in a case where weighting based on a reliability degree is not performed.

FIG. 7 indicates the value of the evaluation function J in a case in which the weighting coefficient w is set to w=1 so that the terms on the right-hand side of Formula 11 are not weighted.

When the terms on the right-hand side of Formula 11 are not weighted, the variable y that minimizes the value of the evaluation function J becomes y=6, and the estimation result is greatly influenced by observed value=8 that is an outlier.

Figure 8:
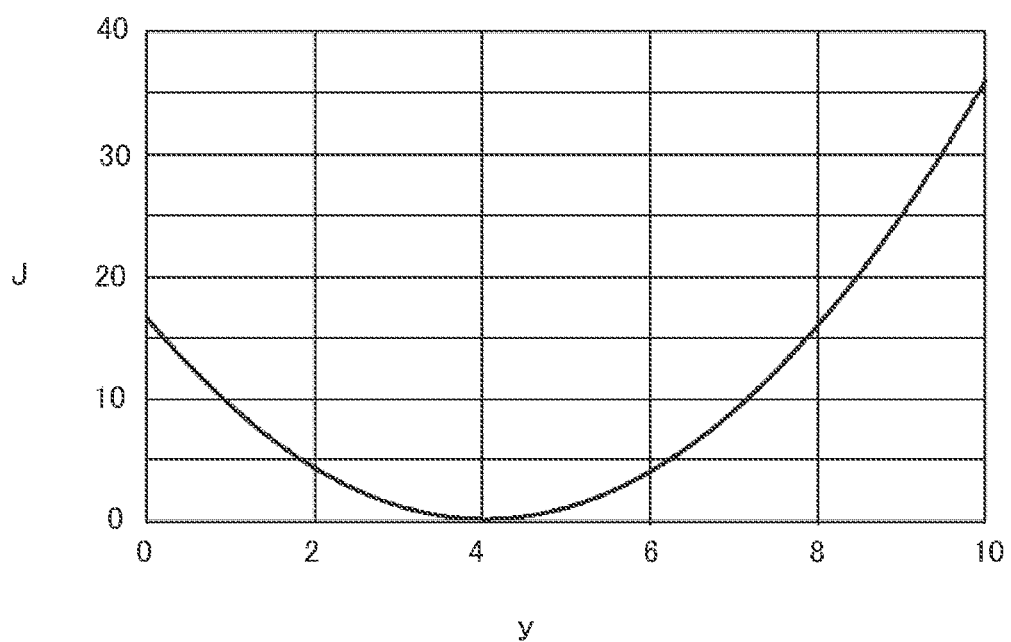
FIG. 8 is a graph indicating the value of an evaluation function in a case where weighting is performed based on a reliability degree.

FIG. 8 indicates the value of the evaluation function J in a case in which the weighting is performed by setting the weighting coefficient w to w=0.01 to reduce the influence of the outlier.

When weighting is performed using the weighting coefficient w=0.01, i.e., when the weight of observed value=8, which is an outlier, is decreased, the variable y that minimizes the value of the evaluation function J becomes y≈4, and the influence of observed value=8 on the estimation result is reduced.

Thus, decreasing the weight of an outlier makes it possible to reduce the influence of the outlier on the estimation result.

Here, the evaluation function J of Formula 9 includes more terms to be added compared with the evaluation function J of Formula 11 and includes terms that are not in quadratic form, the evaluation function J of Formula 9 is more complicated than the evaluation function J of Formula 11. However, similarly to the evaluation function J of Formula 11, the influence of an outlier on the estimation result can be reduced by decreasing the weight of the outlier.

As described above, control unit 21 performs moving horizon estimation in which a state estimated value is obtained by performing an optimization calculation for minimizing the value of the evaluation function J of Formula 9. Alternatively, instead of performing the moving horizon estimation, control unit 21 may be configured to design a known extended Kalman filter for the system represented by Formulas 5 through 8 and to change the covariance matrix R used in the extended Kalman filter according to the reliability degree W.

However, although constraints described later can be imposed in the moving horizon estimation, no constraint can be imposed when the extended Kalman filter is used.

Figure 9:
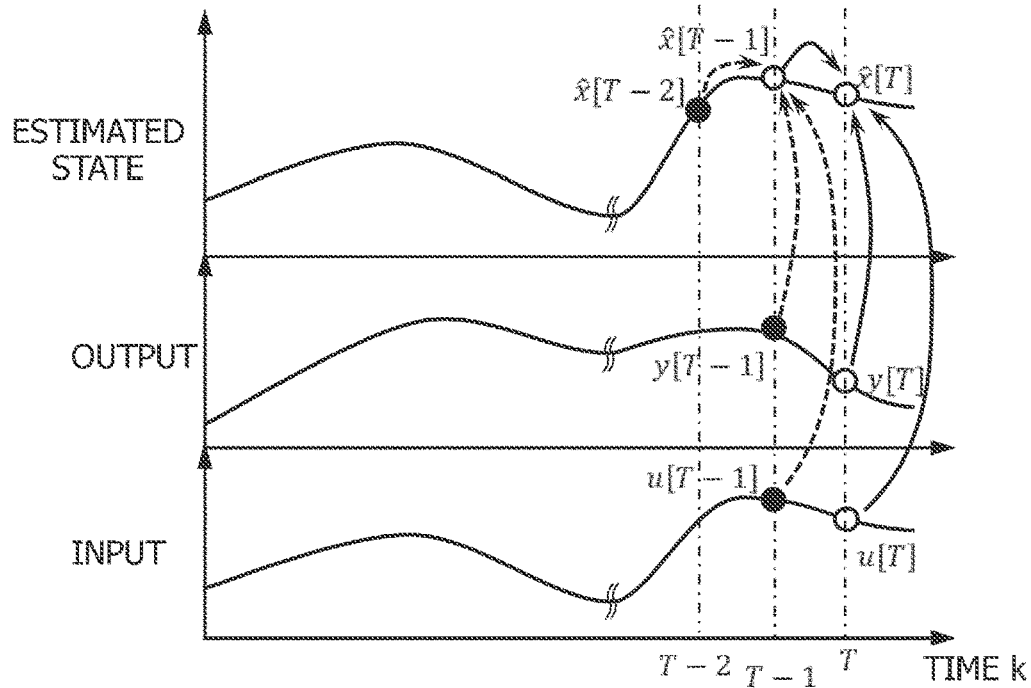
FIG. 9 is a time chart illustrating state estimation performed with an extended Kalman filter.

FIG. 9 illustrates sequential computation in the extended Kalman filter in which the estimation result in the previous sampling is corrected using the output and input of the current sampling.

Figure 10:
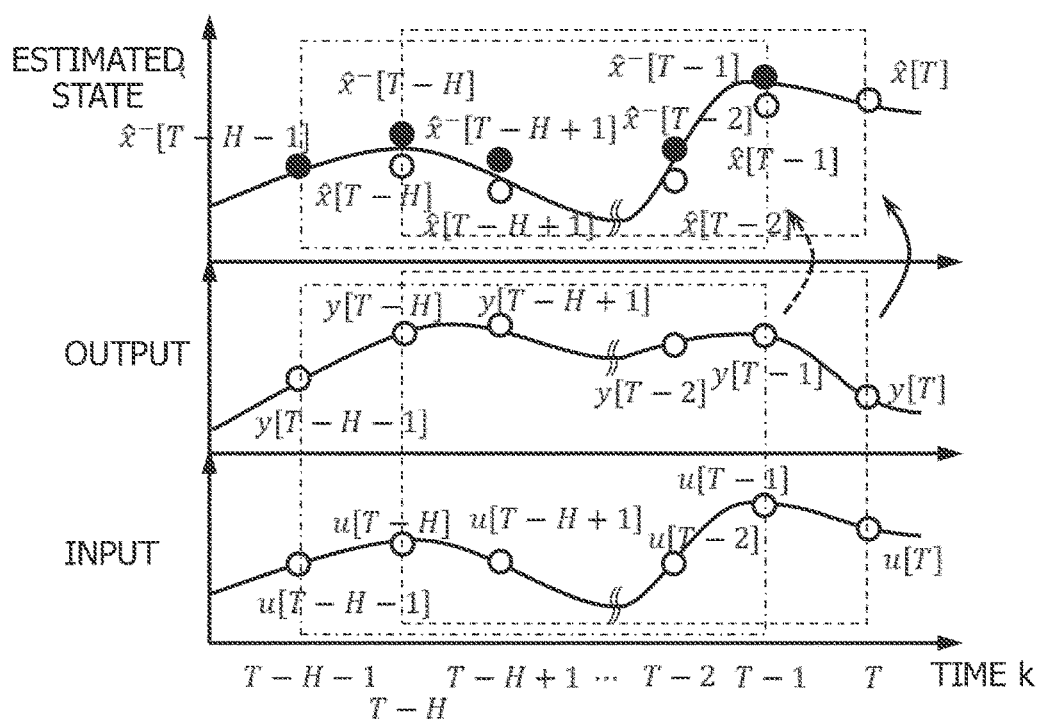
FIG. 10 is a time chart illustrating state estimation performed according to moving horizon estimation.

FIG. 10 illustrates moving horizon estimation in which an estimated value is calculated using all inputs (control input values) and outputs (observed values) within a given evaluation period (in other words, within an estimation horizon).

In the sequential computation of the extended Kalman filter, once an outlier is incorporated into estimation and an estimation error occurs, the error needs to be corrected gradually and sequentially.

On the other hand, in the moving horizon estimation, even if an outlier is incorporated into estimation, the influence of the outlier can be reduced and an error can be corrected quickly as long as the outlier is identified in the next or subsequent sampling.

For this reason, control unit 21 employs the moving horizon estimation instead of the extended Kalman filter.

When calculating an estimated value that minimizes the value of the evaluation function J represented by Formula 9 at step S505B of the flowchart of FIG. 6 described above, control unit 21 can impose a constraint on the estimated value.

Here, the constraint on the estimated value is a condition that is expressed by an equation or an inequality and that needs to be satisfied by the estimated value calculated to minimize the evaluation function J.

Below, the constraint is described using a simple numerical example.

When the coefficient w in the evaluation function J of Formula 11 is set to 1 and when no constraint is imposed on the variable y, the variable y that minimizes the evaluation function J becomes variable y=6, as indicated in FIG. 7.

However, when a constraint "variable y≤4" is imposed, the variable y needs to be less than or equal to 4. Accordingly, the variable y that minimizes the evaluation function J under the constraint "variable y≤4" becomes 4.

Thus, by imposing a constraint on the estimated value, control unit 21 can limit the range of the estimated value and reduce the influence of the outlier (observed value=8) on the estimated value.

Control unit 21 imposes constraints as described below on estimated values.

For example, when vehicle 10 travels on a maintained road such as an arterial road or an expressway, the curvature κ of the travel route does not change rapidly.

Therefore, control unit 21 imposes a constraint represented by Formula 12 on an estimated value $\hat{\kappa}$ of the curvature κ such that the change amount of the estimated value $\hat{\kappa}$ of the curvature κ becomes less than or equal to a constant value ($\Delta\kappa_{max}$).

$$|\vec{\kappa}[k] - \hat{\kappa}^{-}[k-1]| \leq \Delta\kappa_{max} \quad \text{[Formula 12]}$$

In Formula 12, $\hat{\kappa}^{-}$ is an estimated value of the curvature κ in the previous sampling.

Also, $\Delta\kappa_{max}$ in Formula 12 is the upper limit of the change amount of the curvature κ per unit travel distance of vehicle 10. For example, $\Delta\kappa_{max}$ is set based on the maximum value of the curvature change rate of a general road.

Here, control unit 21 can calculate the value of $\Delta\kappa_{max}$ based on the change amount of the curvature of a road obtained from map information, and can change the value of $\Delta\kappa_{max}$ for each sampling.

By imposing a constraint that sets an upper limit on the change amount of the estimated value $\hat{\kappa}$ of the curvature κ, control unit 21 can prevent the estimated value $\hat{\kappa}$ of the curvature κ from deviating significantly from the actual value even if, for example, an observed value of the curvature κ deviating significantly from the actual value is used for state estimation.

Also, when vehicle 10 is traveling along a driving lane, the lateral position z of vehicle 10 does not change rapidly.

Therefore, control unit 21 imposes a constraint represented by Formula 13 on an estimated value $\hat{z}$ of the lateral position z such that the change amount of the estimated value $\hat{z}$ of the lateral position z becomes less than or equal to a constant value ($\Delta z_{max}$).

$$|\hat{z}[k] - \hat{z}^{-}[k-1]| \leq \Delta z_{max} \quad \text{[Formula 13]}$$

In Formula 13, $\hat{z}^{-}$ is an estimated value in the previous sampling.

Also, $\Delta z_{max}$ in Formula 13 is the upper limit of the change amount of the lateral position z per unit time. For example, $\Delta z_{max}$ is based on the maximum value of the change amount of the lateral position z that can generally occur when vehicle 10 travels along a driving lane.

Also, because the change amount of the lateral position z varies according to the vehicle speed V, control unit 21 can change the upper limit $\Delta z_{max}$ according to the vehicle speed V of vehicle 10.

By imposing a constraint that sets an upper limit on the change amount of the estimated value $\hat{z}$ of the lateral position z, control unit 21 can prevent the estimated value $\hat{z}$ of the lateral position z from deviating significantly from the actual value even if, for example, the observed values of the left lane marking position dl and/or the right lane marking position dr that deviating significantly from the actual values is used for state estimation.

Also, the road width of a major road such as an arterial road or an expressway is determined by a standard.

Therefore, control unit 21 imposes a constraint represented by Formula 14 on an estimated value $\hat{D}$ of the road width D so that the estimated value $\hat{D}$ of the road width D falls within a predetermined range.

$$D_{min} \leq \hat{D}[k] \leq D_{max} \quad \text{[Formula 14]}$$

In Formula 14, $D_{min}$ indicates the minimum value (lower limit) of the road width D, and $D_{max}$ indicates the maximum value (upper limit) of the road width D. For example, based on a standard of the road width, the minimum value $D_{min}$ is set at 2.5 m and the maximum value $D_{max}$ is set at 4 m.

By imposing a constraint that sets the lower limit and the upper limit of the estimated value $\hat{D}$ of the road width D, control unit 21 can prevent the estimated value of the road width D from deviating significantly from the actual value when, for example, the position of a road marking other than a lane marking is measured.

Next, a process of setting the reliability degree W by control unit 21 (reliability setting unit 214), i.e., the process at step S504 of FIG. 4, is described in detail.

For each of the observed values (the left and right lane marking positions dl and dr, the yaw angle α, the curvature κs, and the curvature κm), control unit 21 sets a reliability degree W that is an index value indicating the accuracy (preciseness or correctness) of a measurement result.

The reliability degree W takes a value between 0 and 1 ($0 < W \leq 1$). As the value of the reliability degree W becomes closer to 1, the accuracy becomes higher; and as the value of the reliability degree W becomes closer to 0, the accuracy becomes lower.

That is, control unit 21 can correctly estimate a state by using an observed value whose reliability degree W is close to 1 for state estimation. When an observed value of which reliability degree W is close to 0 (in other words, an outlier) is used for state estimation, it is highly probable that an error will occur in the state estimation.

Control unit 21 calculates a reliability base value Wtmp based on an error between an observed value y and an estimated value y^=h(x^) obtained from the observation equation of Formula 8 using an estimated state, and corrects the reliability base value Wtmp according to, for example, the degree of variation of the observed value y, a traveling state of vehicle 10, and a surrounding environment of vehicle 10 to obtain the final reliability degree W.

Control unit 21 calculates the reliability base value Wtmp according to Formula 15.

$$W_{tmp} = \min\left(\frac{(3\sigma)^2}{(y - \hat{y})^2}, 1\right) \qquad \text{[Formula 15]}$$

In Formula 15, σ is the standard deviation of the error between the observed value y and the estimated value y^, and $G^2$ is the variance of the error between the observed value y and the estimated value y^.

Figure 11:
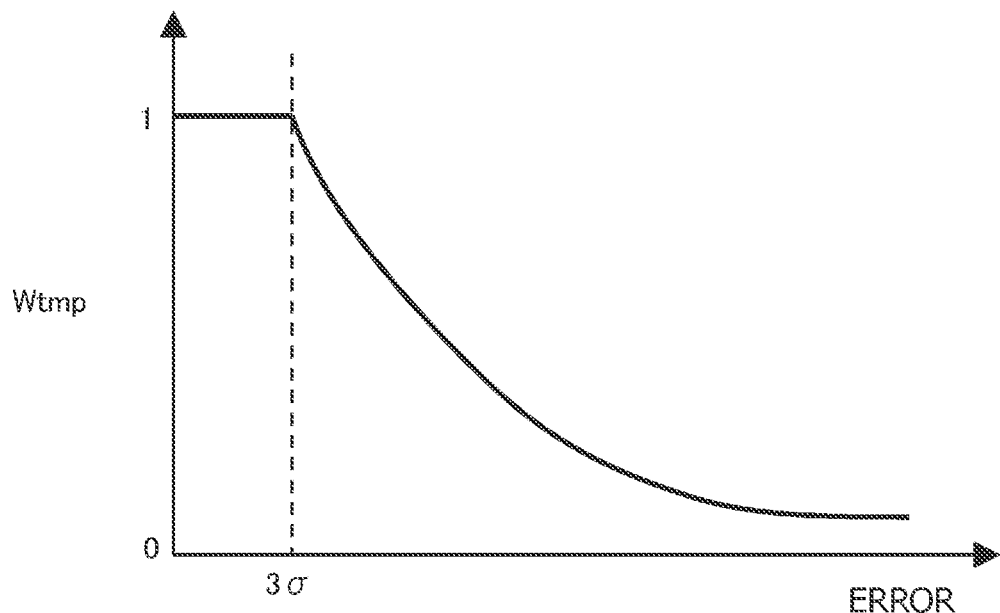
FIG. 11 is a graph indicating the correlation between an error and a reliability base value Wtmp.

FIG. 11 indicates the correlation between the error between the observed value y and the estimated value y^ and the reliability base value Wtmp.

When the error between the observed value y and the estimated value y^ is less than 3σ, the error is sufficiently small and the observed value y being processed is sufficiently reliable. In this case, control unit 21 sets the reliability base value Wtmp to 1, which is the maximum value.

On the other hand, when the error between the observed value y and the estimated value y^ is greater than 3σ, because the reliability of the observed value y decreases as the error increases, control unit 21 gradually decreases the reliability base value Wtmp as the error increases to reduce the influence of the less-reliable observed value y on the state estimation.

Although 3σ is used as the error criterion in Formula 15, the error criterion is not limited to 3σ.

Control unit 21 can use, for example, σ instead of 3σ for the calculation of the reliability base value Wtmp when it is desired to perform state estimation using only information with a small error. On the other hand, control unit 21 can use, for example, 5σ instead of 3σ for the calculation of the reliability base value Wtmp when it is desired to perform state estimation also using information with a relatively large error.

Thus, control unit 21 sets the reliability base value Wtmp according to an error between the observed value y and the estimated value y^ to set a weight corresponding to the error.

However, there are cases in which the observed value y is not reliable even when the error is small.

Also, with a method in which the weight is set according to an error, once the estimation fails and the estimated value y^ deviates significantly from the true value, the weight becomes small even if a true value is measured, and it may become impossible to correct the estimated value y^.

Therefore, control unit 21 sets the final reliability degree W by correcting the reliability base value Wtmp according to, for example, the degree of variation of the observed value, the traveling state of vehicle 10, and the surrounding environment of vehicle 10.

Figure 12:
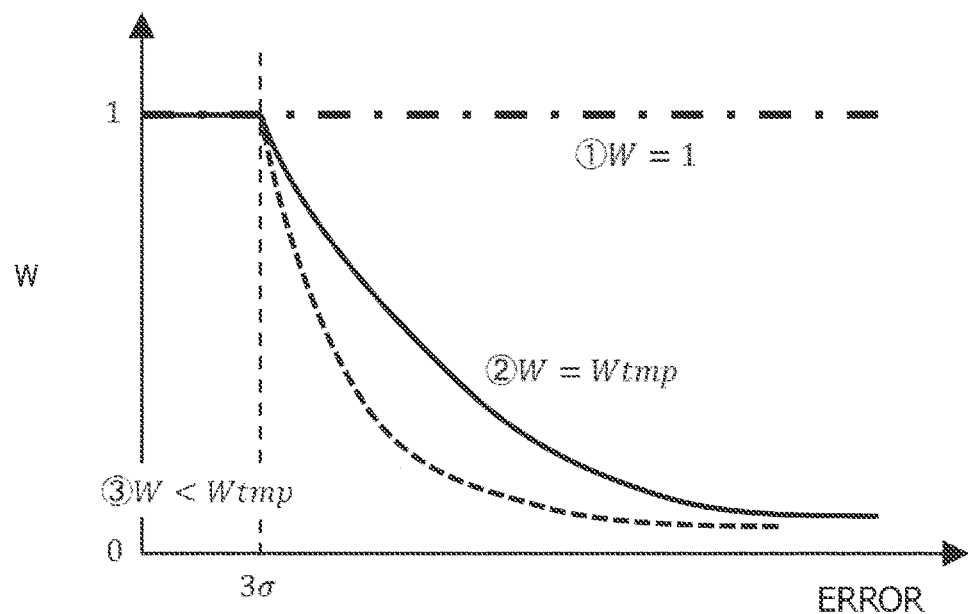
FIG. 12 is a graph indicating a method of correcting a reliability base value Wtmp.

FIG. 12 indicates correction patterns for correcting the reliability base value Wtmp. When determining that the observed value is sufficiently reliable, control unit 21 fixes the reliability degree W at 1 as indicated by a dashed-dotted line in FIG. 12. In this case, lane estimation is performed based on the observed value regardless of the error between the observed value y and the estimated value y^.

When determining that the observed value is unreliable, control unit 21 corrects the reliability degree W such that the reliability degree W becomes smaller than the reliability base value Wtmp as indicated by a dotted line in FIG. 12.

Methods of setting the reliability degree W smaller than the reliability base value Wtmp include, for example, a method in which the square value of the reliability base value Wtmp is set as the reliability degree W and a method in which a value obtained by multiplying the reliability base value Wtmp by a constant between 0 and 1 is set as the reliability degree W.

When control unit 21 sets the square value of the reliability base value Wtmp as the reliability degree W, the influence of an error on the reliability degree W can be increased.

When control unit 21 sets a value obtained by multiplying the reliability base value Wtmp by a constant as the reliability degree W, the influence of an error on state estimation can be reduced at a constant percentage regardless of the size of the error.

Here, control unit 21 can change the methods of setting the reliability degree W smaller than the reliability base value Wtmp according to, for example, the observed value being processed or a condition based on which the observed value is determined to be unreliable.

Also, when neither a determination result indicating that the observed value is sufficiently reliable nor a determination result indicating that the observed value is not reliable is obtained, control unit 21 sets the reliability degree W to match the reliability base value Wtmp as indicated by a solid line in FIG. 12.

Below, the method of correcting the reliability degree W is described in more detail.

FIG. 13 indicates conditions for correcting reliability degrees W of the left and right lane marking positions dl and dr measured using external recognition sensor 22 and the corrected reliability degrees W.

Here, the method in which the square value of the reliability base value Wtmp is set as the reliability degree W is used as the method for making the reliability degrees W of the left and right lane marking positions dl and dr smaller than the reliability base value Wtmp.

This is to reduce the adverse effect of the measurement results of the left and right lane marking positions dl and dr on the state estimation by increasing the influence of errors on the reliability degrees W.

In the case of a condition [T-1-1] of FIG. 13 in which vehicle 10 is near an intersection, because no lane marking exists in an intersection and external recognition sensor 22 cannot measure the left and right lane marking positions dl and dr, the reliability of the measurement results of the left and right lane marking positions dl and dr is supposed to be low.

Therefore, when determining that the distance between vehicle 10 and an intersection is less than or equal to a predetermined value and vehicle 10 is near the intersection based on information from navigation system 25, control unit 21 sets the reliability degrees W of the left and right lane marking positions dl and dr to the square value of the reliability base value Wtmp (W=Wtmp$^2$<Wtmp).

That is, when vehicle 10 is near an intersection, control unit 21 sets the reliability degrees W of the left and right lane marking positions dl and dr to values that are less than the reliability base value Wtmp as indicated by the dotted line in FIG. 12.

Here, if control unit 21 changes the reliability degree W abruptly from the reliability base value Wtmp to the square value of the reliability base value Wtmp, the estimated value also changes abruptly, and the stability of steering control may be impaired.

For this reason, control unit 21 can gradually change the reliability degree W between the reliability base value Wtmp and the square value of the reliability base value Wtmp.

Figure 14:
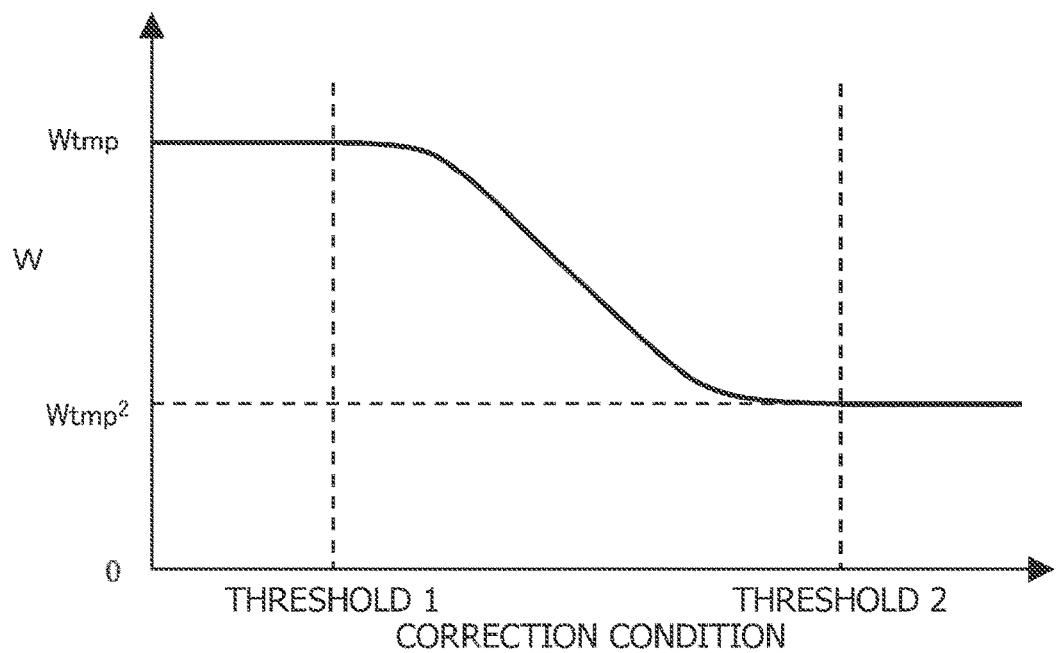
FIG. 14 is a drawing illustrating a method of interpolating a reliability degree W.

FIG. 14 is a drawing used to describe a method of gradually changing the reliability degree W.

Control unit 21 sets two thresholds representing a condition for correcting the reliability degree W and gradually changes the reliability degree W from the reliability base value Wtmp to the square value of the reliability base value Wtmp while the correction condition changes from a first threshold to a second threshold.

For example, in the case of the condition [T-1-1], control unit 21 starts to decrease the reliability degree W when the distance between vehicle 10 and the intersection decreases to the first threshold.

Then, control unit 21 continuously changes the reliability degree W from the reliability base value Wtmp to the square value of the reliability base value Wtmp such that the reliability degree W reaches the square value of the reliability base value Wtmp when the distance between vehicle 10 and the intersection reaches the second threshold that is shorter than the first threshold.

Here, control unit 21 can continuously change the reliability degree W from the reliability base value Wtmp to the square value of the reliability base value Wtmp by an interpolation calculation using, for example, a cubic function.

It is apparent that the process for preventing the abrupt change of the reliability degree W based on the satisfaction of the correction condition in the correction process of the reliability degree W can also be applied to conditions other than the intersection described below and to the correction of reliability degrees W of observed values other than the left and right lane marking positions dl and dr.

Next, there is described a process of correcting the reliability degrees W of the left and right lane marking positions dl and dr in a condition [T-1-2] of FIG. 13 in which vehicle 10 is in the stopped state, in other words, a process of correcting the reliability degrees W of the left and right lane marking positions dl and dr according to the vehicle speed V.

Examples of situations in which vehicle 10 is stopped in a driving lane may include a case in which vehicle 10 is stopped at, or immediately before, a stop line of an intersection while waiting for a traffic light, and a case in which vehicle 10 is stopped behind a stopped leading vehicle.

When vehicle 10 is stopped near an intersection, external recognition sensor 22 cannot measure the left and right lane marking positions dl and dr because no lane marking exists in an intersection.

Also, when vehicle 10 is stopped behind a leading vehicle and the distance between vehicle 10 and the leading vehicle is relatively short, external recognition sensor 22 may not be able to correctly measure the left and right lane marking positions dl and dr because the leading vehicle blocks a part of a recognizable area of external recognition sensor 22.

Figure 15:
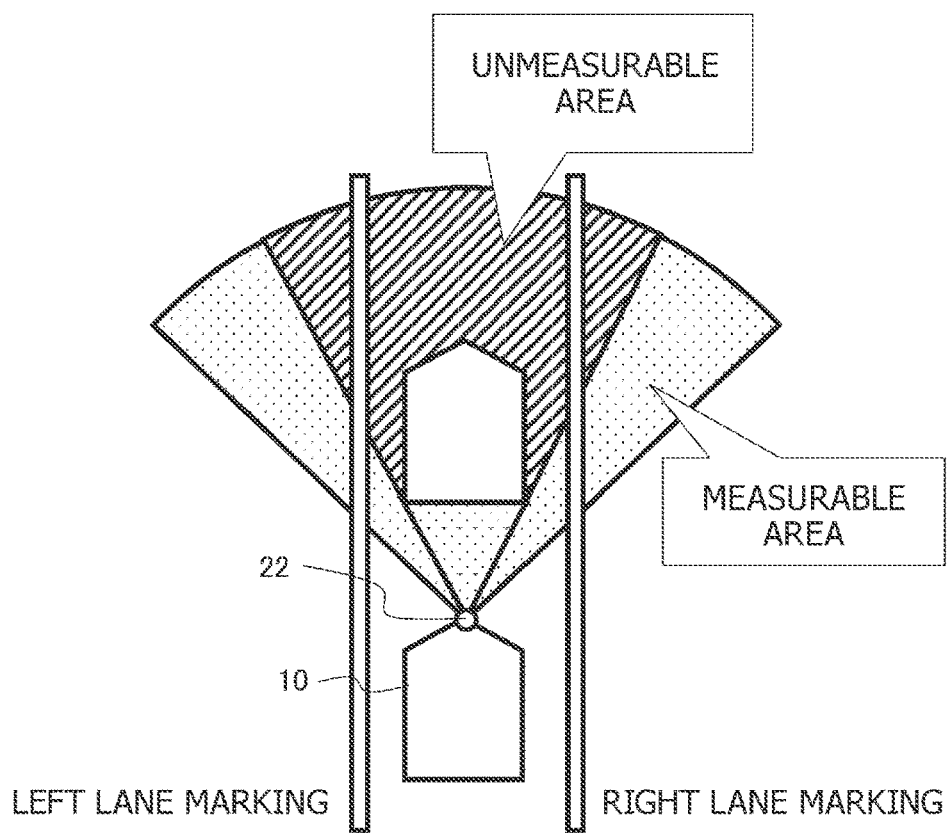
FIG. 15 is a drawing illustrating a correlation between the recognizable range of an external recognition sensor and a leading vehicle.

FIG. 15 is a drawing illustrating a state in which the leading vehicle narrows the recognizable area of external recognition sensor 22. A part behind the leading vehicle from the viewpoint of external recognition sensor 22 is an area that cannot be measured by external recognition sensor 22.

For this reason, when determining that the vehicle speed V is lower than a predetermined speed and vehicle 10 is stopped, control unit 21 sets the reliability degrees W of the left and right lane marking positions dl and dr to the square value of the reliability base value Wtmp.

Next, there is described a process of setting the reliability degrees W of the left and right lane marking positions dl and dr in a condition [T-1-3] of FIG. 13, i.e., when the left and right lane marking positions dl and dr are supposed to be correctly measured.

Even when the errors between the observed values and the estimated values are large, as long as the left and right lane marking positions dl and dr are measured correctly, control unit 21 can proceed with the correction of the estimated values by setting the reliability degrees W to 1 and thereby incorporating the observed values of the left and right lane marking positions dl and dr into state estimation.

Accordingly, when the measurement variations of the left and right lane marking positions dl and dr, the yaw angle α, and the curvature κs are all small and the measured road width D (in other words, the sum of absolute values of the left and right lane marking positions dl and dr) is within a predetermined range, control unit 21 presumes that the left and right lane marking positions dl and dr are correctly measured and sets the reliability degrees W of the left and right lane marking positions dl and dr to 1.

Here, control unit 21 can, for example, store observed values obtained within a predetermined period of time in the past in a memory, calculate a variance using the stored observed values, and determine the degree of measurement variation of the observed values based on the variance.

Also, control unit 21 can obtain, by sequential computation, a variance such that the influence of an observed value gradually decreases as the observed value becomes older on a time-series basis and use the variance to determine the measurement variation of observed values.

Here, when calculating the yaw angle α and the curvature κs using a recognition result of external recognition sensor 22, information on the left and right lane marking positions dl and dr is generally used. Accordingly, unless the left and right lane marking positions dl and dr are measured correctly, the yaw angle α and the curvature κs cannot be calculated correctly.

In other words, when the yaw angle α and the curvature κs are not calculated correctly, it is possible that the left and right lane marking positions dl and dr are not measured correctly.

Therefore, control unit 21 determines the degree of variation of the yaw angle α and the degree of variation of the curvature κs for the condition [T-1-3] in FIG. 13.

Furthermore, control unit 21 determines that the left and right lane marking positions dl and dr are correctly measured only when the road width D measured based on information on the left and right lane marking positions dl and dr is within a predetermined range so that a result of erroneously measuring a lane marking of a lane different from the driving lane is not used for state estimation.

Here, the predetermined range of the road width D is based on the road widths of general roads and is, for example, greater than or equal to 2.5 m and less than or equal to 4 m.

Next, there is described a process of separately setting the reliability degree W of the left lane marking position dl and the reliability degree W of the right lane marking position dr in a condition [T-1-4] and a condition [T-1-5] of FIG. 13.

Depending on, for example, road conditions, it may not always be possible to measure both of the right and left lane markings correctly, and there may be a case in which one of the right and left lane markings can be measured correctly, but the other one of them cannot be measured correctly.

For this reason, when the measurement variation of one of the lane marking positions is small, the measurement variation of the curvature κs is small, and the measured road width D is within a predetermined range, control unit 21 sets the reliability degree W of one of the right and left lane marking positions with a smaller measurement variation, i.e., one of the right and left lane marking positions that is supposed to be measured correctly, to 1, and sets the reliability degree W of the other one of the right and left lane marking positions to the reliability base value Wtmp.

Here, because both of the left and right lane marking positions dl and dr need to be correctly measured to calculate the yaw angle α using external recognition sensor 22, the degree of variation of the yaw angle α is excluded from the conditions [T-1-4] and [T-1-5] of FIG. 13.

Next, there is described a process of setting the reliability degrees W of the left and right lane marking positions dl and dr according to the relative distance between vehicle 10 and a leading vehicle in a condition [T-1-6] of FIG. 13.

As illustrated in FIG. 15, when the distance between vehicle 10 and the leading vehicle is short, the leading vehicle blocks an area that is recognizable by external recognition sensor 22, and external recognition sensor 22 may not be able to correctly measure the left and right lane marking positions dl and dr.

Therefore, when the distance to the leading vehicle recognized using external recognition sensor 22 is shorter than a predetermined value, control unit 21 sets the reliability degrees W of the left and right lane marking positions dl and dr to the square value of the reliability base value Wtmp.

Next, there is described a process of correcting the reliability degrees W of the left and right lane marking positions dl and dr in a condition [T-1-7] of FIG. 13 in which the measurement variations of the left and right lane marking positions dl and dr are large.

When the measurement variations of the left and right lane marking positions dl and dr are large, even if lane estimation unit 215 uses the reliability base value Wtmp based on Formula 15 for lane estimation, the influence of the measurement variations cannot be sufficiently reduced, and the errors between observed values and estimated values may adversely affect state estimation.

Therefore, when the measurement variation of the left lane marking position dl is greater than or equal to a predetermined value and the measurement variation of the right lane marking position dr is also greater than or equal to the predetermined value, control unit 21 sets the reliability degrees W of the left lane marking position dl and the right lane marking position dr to the square value of the reliability base value Wtmp.

Here, the process of correcting the reliability degrees W in each of the conditions [T-1-3]-[T-1-5] and [T-1-7] described above is a process of correcting the reliability degrees W of the left lane marking position dl and the right lane marking position dr according to the variations of observed values.

If none of the conditions [T-1-1]-[T-1-7] of FIG. 13 is satisfied, control unit 21 determines that a condition [T-1-8] of FIG. 13 is satisfied and sets the reliability degrees W of the left lane marking position dl and the right lane marking position dr to the reliability base value Wtmp.

By correcting the reliability degrees W of the left and right lane marking positions dl and dr for each of the conditions [T-1-1]-[T-1-8] of FIG. 13, control unit 21 can incorporate the measurement results of the left and right lane marking positions dl and dr into state estimation (lane estimation) when the left and right lane marking positions dl and dr are measured correctly, and can perform state estimation (lane estimation) while reducing the influence of the measurement results of the left and right lane marking positions dl and dr when the left and right lane marking positions dl and dr are not measured correctly.

FIG. 16 indicates conditions for correcting the reliability degree W of the yaw angle α measured using external recognition sensor 22 and the corrected reliability degree W. Here, as the method of making the reliability degree W of the yaw angle α smaller than the reliability base value Wtmp, control unit 21 employs a method in which the reliability degree W is set to a value (W=Wtmp×$10^{-3}$) obtained by multiplying the reliability base value Wtmp by a predetermined value (e.g., $10^{-3}$).

This is because the measurement result of the yaw angle α may not always be reliable even if the error is small since control unit 21 generally uses information on the left and right lane marking positions dl and dr to calculate the yaw angle α with external recognition sensor 22.

That is, the adverse effect of the measurement result of the yaw angle α on the estimated value cannot be fully eliminated by just increasing the influence of an error on the reliability degree W by control unit 21.

First, there is described a process of correcting the reliability degree W of the yaw angle α in a condition [T-2-1] of FIG. 16 in which vehicle 10 is near an intersection. Because no lane marking exists in an intersection, external recognition sensor 22 cannot measure the left and right lane marking positions dl and dr, and therefore the yaw angle α cannot be calculated based on the measurement results of the left and right lane marking positions dl and dr.

Therefore, when determining, based on information from navigation system 25, that the distance between vehicle 10 and an intersection is less than or equal to a predetermined value and that vehicle 10 is near the intersection, control unit 21 sets the reliability degree W of the yaw angle α to a value obtained by multiplying the reliability base value Wtmp by $10^{-3}$ (W=Wtmp×$10^{-3}$).

Next, there is described a process of correcting the reliability degree W of the yaw angle α in a condition [T-2-2] of FIG. 16 in which vehicle 10 is in the stopped state, in other words, a process of correcting the reliability degree W of the yaw angle α according to the vehicle speed V.

Examples of situations in which vehicle 10 is stopped in a driving lane may include a case in which vehicle 10 is stopped at, or immediately before, a stop line of an intersection while waiting for a traffic light, and a case in which vehicle 10 is stopped behind a stopped leading vehicle.

When vehicle 10 is stopped near an intersection, external recognition sensor 22 cannot measure the left and right lane marking positions dl and dr because no lane marking exists in an intersection.

Also, when vehicle 10 is stopped behind a leading vehicle and the distance between vehicle 10 and the leading vehicle is relatively short, external recognition sensor 22 may not be able to correctly measure the left and right lane marking positions dl and dr because the leading vehicle blocks a part of a recognizable area of external recognition sensor 22, as illustrated in FIG. 15.

That is, when vehicle 10 is in the stopped state, the measurement accuracy of the left and right lane marking positions dl and dr decreases, and as a result, the measurement accuracy of the yaw angle $\alpha$ also decreases.

Therefore, when determining that the vehicle speed V is less than a predetermined vehicle speed and vehicle 10 is stopped, reliability setting unit 214 of control unit 21 sets the reliability degree W of the yaw angle $\alpha$ to a value obtained by multiplying the reliability base value Wtmp by $10^{-3}$.

Next, there is described a process of setting the reliability degree W of the yaw angle $\alpha$ in a condition [T-2-3] of FIG. 16 in which the yaw angle $\alpha$ is presumed to be measured correctly, in other words, a process of correcting the reliability degree W according to the variation of the observed value.

Even when an error between the observed value and the estimated value is large, as long as it can be determined that the yaw angle $\alpha$ is correctly measured, control unit 21 can proceed with the correction of the estimated value by setting the reliability degree to 1 and thereby incorporating the observed value of the yaw angle $\alpha$ into state estimation.

Therefore, control unit 21 sets the reliability degree W of the yaw angle $\alpha$ to 1 when the measurement variations of all of the left and right lane marking positions dl and dr, the yaw angle $\alpha$, and the curvature $\kappa s$ are small.

Here, when calculating the yaw angle $\alpha$ using external recognition sensor 22, control unit 21 generally uses information on the left and right lane marking positions dl and dr. Therefore, unless both of the left and right lane marking positions dl and dr are measured correctly, the yaw angle $\alpha$ cannot be calculated correctly.

For this reason, the condition [T-2-3] of FIG. 16 includes the degrees of variation of the left and right lane marking positions dl and dr as decision conditions.

Also, because control unit 21 calculates the curvature $\kappa s$ based on information on the left and right lane marking positions dl and dr, it is possible that the yaw angle $\alpha$ has not been calculated correctly when there is variation in the measurement result of the curvature $\kappa s$. Therefore, the condition [T-2-3] of FIG. 16 also includes the degree of variation of the curvature $\kappa s$ as a decision condition.

Next, there is described a process of setting the reliability degree W of the yaw angle $\alpha$ according to the relative distance between vehicle 10 and a leading vehicle in a condition [T-2-4] of FIG. 16.

As illustrated in FIG. 15, when the distance between vehicle 10 and a leading vehicle is short, the leading vehicle blocks an area that is recognizable by external recognition sensor 22, and external recognition sensor 22 may not be able to correctly measure the left and right lane marking positions dl and dr. When the left and right lane marking positions dl and dr are not measured correctly, the measurement accuracy of the yaw angle $\alpha$ also decreases.

Therefore, when the distance to the leading vehicle recognized by external recognition sensor 22 is shorter than a predetermined value, control unit 21 sets the reliability degrees W of the yaw angle $\alpha$ to a value obtained by multiplying the reliability base value Wtmp by $10^{-3}$.

Next, there is described a process of setting the reliability degree W of the yaw angle $\alpha$ in a condition [T-2-5] of FIG. 16 in which the measurement variations of the left and right lane marking positions dl and dr are large.

Here, when calculating the yaw angle $\alpha$ using external recognition sensor 22, control unit 21 generally uses information on the left and right lane marking positions dl and dr. Accordingly, when the variation of at least one of the left and right lane marking positions dl and dr is large, control unit 21 cannot calculate the yaw angle $\alpha$ correctly.

Therefore, when the variation of at least one of the left and right lane marking positions dl and dr is large, control unit 21 sets the reliability degree W of the yaw angle $\alpha$ to a value obtained by multiplying the reliability base value Wtmp by $10^{-3}$.

When none of the conditions [T-2-1]-[T-2-5] is satisfied, control unit 21 determines that a condition [T-2-6] of FIG. 16 is satisfied and sets the reliability degree W of the yaw angle $\alpha$ to the reliability base value Wtmp.

By correcting the reliability degree W of the yaw angle $\alpha$ for each of the conditions [T-2-1]-[T-2-6] of FIG. 16, control unit 21 can incorporate the measurement result of the yaw angle $\alpha$ into state estimation (lane estimation) when the yaw angle $\alpha$ is measured correctly, and can perform state estimation (lane estimation) while reducing the influence of the measurement result of the yaw angle $\alpha$ when the yaw angle $\alpha$ is not measured correctly.

FIG. 17 indicates conditions for correcting the reliability degree W of the curvature $\kappa s$ measured using external recognition sensor 22 and the corrected reliability degree W.

Here, as the method of making the reliability degree W of the curvature $\kappa s$ smaller than the reliability base value Wtmp, control unit 21 employs a method in which the reliability degree W is set to a value (W=Wtmp×$10^{-3}$) obtained by multiplying the reliability base value Wtmp by a predetermined value (e.g., $10^{-3}$).

This is because the measurement result of the curvature $\kappa s$ may not always be reliable even if the error is small since control unit 21 generally uses information on the left and right lane marking positions dl and dr when calculating the curvature $\kappa s$ using external recognition sensor 22.

That is, the adverse effect of the measurement result of the curvature $\kappa s$ on the estimated value cannot be fully eliminated by just increasing the influence of the error on the reliability degree W by control unit 21.

First, there is described a process of correcting the reliability degree W of the curvature $\kappa s$ based on a measurement limit in a condition [T-3-1] of FIG. 17. Control unit 21 calculates the curvature $\kappa s$ based on information on the left and right lane marking positions dl and dr measured using external recognition sensor 22.

However, because the area (recognition range) that can be measured by external recognition sensor 22 is limited, it is not possible to measure a curvature $\kappa s$ greater than a certain value using external recognition sensor 22.

Therefore, when the curvature $\kappa s$ measured using external recognition sensor 22 is greater than a predetermined upper limit that is set based on the measurable area of external recognition sensor 22, control unit 21 sets the reliability degree W of the curvature $\kappa s$ to a value obtained by multiplying the reliability base value Wtmp by $10^{-3}$.

Next, there is described a process of correcting the reliability degree W of the curvature $\kappa s$ in a condition [T-3-2] of FIG. 17 in which vehicle 10 is near an intersection.

Because no lane marking exists in an intersection, external recognition sensor 22 cannot measure the left and right lane marking positions dl and dr when vehicle 10 is near an intersection, and therefore, the curvature κs cannot be calculated based on the left and right lane marking positions dl and dr.

Accordingly, when determining, based on information from navigation system 25, that the distance between vehicle 10 and an intersection is less than or equal to a predetermined value and vehicle 10 is near the intersection, control unit 21 sets the reliability degree W of the curvature κs measured using external recognition sensor 22 to a value obtained by multiplying the reliability base value Wtmp by $10^{-3}$.

Next, there is described a process of correcting the reliability degree W of the curvature κs in a condition [T-3-3] of FIG. 17 in which vehicle 10 is in the stopped state, in other words, a process of correcting the reliability degree W of the curvature κs according to the vehicle speed V.

Examples of situations in which vehicle 10 is stopped in a driving lane may include a case in which vehicle 10 is stopped at, or immediately before, a stop line of an intersection while waiting for a traffic light, and a case in which vehicle 10 is stopped behind a stopped leading vehicle.

When vehicle 10 is stopped near an intersection, external recognition sensor 22 cannot measure the left and right lane marking positions dl and dr because no lane marking exists in an intersection.

Also, when vehicle 10 is stopped behind a leading vehicle and the distance between vehicle 10 and the leading vehicle is relatively short, external recognition sensor 22 may not be able to correctly measure the left and right lane marking positions dl and dr because the leading vehicle blocks a part of the recognizable area of external recognition sensor 22 as illustrated in FIG. 15.

That is, when vehicle 10 is in the stopped state, the measurement accuracy of the left and right lane marking positions dl and dr decreases, and as a result, the measurement accuracy of the curvature κs also decreases.

For this reason, when determining that the vehicle speed V is sufficiently low and vehicle 10 is stopped, control unit 21 sets the reliability degrees W of the curvature κs measured using external recognition sensor 22 to a value obtained by multiplying the reliability base value Wtmp by $10^{-3}$.

Next, there is described a process of correcting the reliability degree W of the curvature κs according to the relative distance between vehicle 10 and a leading vehicle in a condition [T-3-4] of FIG. 17.

When the distance between vehicle 10 and the leading vehicle is short, the leading vehicle blocks an area that is recognizable by external recognition sensor 22, as illustrated in FIG. 15, and therefore external recognition sensor 22 may not be able to correctly measure the left and right lane marking positions dl and dr. When the left and right lane marking positions dl and dr are not measured correctly, the measurement accuracy of the curvature κs also decreases.

Therefore, when the distance from the leading vehicle recognized by external recognition sensor 22 is shorter than a predetermined value, control unit 21 sets the reliability degree W of the curvature κs to a value obtained by multiplying the reliability base value Wtmp by $10^{-3}$.

Next, there is described a process of correcting the reliability degree W of the curvature κs according to the measurement variations of the left and right lane marking positions dl and dr in a condition [T-3-5] of FIG. 17.

Here, when calculating the curvature κs using external recognition sensor 22, control unit 21 generally uses one or both of the left and right lane marking positions dl and dr measured using external recognition sensor 22. Therefore, when the measurement variations of both of the left and right lane marking positions dl and dr are large, control unit 21 cannot measure the curvature κs correctly.

For this reason, when the measurement variations of both of the left and right lane marking positions dl and dr are large, control unit 21 sets the reliability degree W of the curvature κs to a value obtained by multiplying the reliability base value Wtmp by $10^{-3}$.

Next, there is described a process of correcting the reliability degree W of the curvature κs based on the accuracy of the curvature κs in a condition [T-3-6] of FIG. 17.

Control unit 21 measures the curvature κs using external recognition sensor 22 and also measures the curvature κm based on the shape of a road (map information) on which vehicle 10 is travelling and that is obtained by navigation system 25.

Also, control unit 21 can calculate a curvature Kd of a travelled path of vehicle 10 based on the vehicle behavior. When vehicle 10 is travelling along lane markings, the difference between the curvature κs/κm of a travel route measured using external recognition sensor 22 or navigation system 25 and the curvature Kd of a travelled path based on the vehicle behavior becomes sufficiently small.

Therefore, control unit 21 compares the curvature κs calculated using external recognition sensor 22, the curvature κm obtained from map information, and the curvature κd calculated based on the behavior of vehicle 10 with each other; and when determining that the accuracy of the curvature κs calculated using external recognition sensor 22 is low, control unit 21 sets the reliability degree W of the curvature κs calculated using external recognition sensor 22 to a value obtained by multiplying the reliability base value Wtmp by $10^{-3}$.

The method of determining the accuracy of the curvature κs is described later in detail.

When none of the conditions [T-3-1]-[T-3-6] described above is satisfied, control unit 21 determines that a condition [T-3-7] of FIG. 17 is satisfied, and sets the reliability degree W of the curvature κs calculated using external recognition sensor 22 to the reliability base value Wtmp.

By correcting the reliability degree W of the curvature κs for each of the conditions [T-3-1]-[T-3-7] of FIG. 17, control unit 21 can incorporate the measurement result of the curvature κs into state estimation (lane estimation) when the curvature κs is correctly measured and can perform state estimation (lane estimation) while reducing the influence of the measurement result of the curvature κs when the curvature κs is not correctly measured.

FIG. 18 indicates conditions for correcting the reliability degree W of the curvature κm obtained from map information and the corrected reliability degree W.

Here, as the method of decreasing the reliability degree W of the curvature κm obtained from map information, control unit 21 employs a method in which the reliability degree W is set to a value (W=Wtmp×$10^{-3}$) obtained by multiplying the reliability base value Wtmp by a predetermined value (e.g., $10^{-3}$).

Examples of errors in the curvature κm obtained from map information include an error caused by a GPS positioning error, an error caused when calculating the curvature κm based on multiple node points, and an error inherent in the map information.

However, control unit 21 cannot determine whether such an error exists based on the comparison between the curvature κm obtained from map information and the estimated value, and the adverse effect of the observed value on the estimated value cannot be fully eliminated by just increasing the influence of the error on the reliability degree W.

First, there is described a process of correcting the reliability degree W of the curvature κm based on a measurement limit in a condition [T-4-1] of FIG. 18.

To correctly perform lane estimation, control unit 21 needs information on the curvature κ of a travel route. If the curvature κs calculated using external recognition sensor 22 is apparently incorrect, control unit 21 needs to use the curvature κm obtained from map information to perform lane estimation.

Therefore, when the curvature κs calculated using external recognition sensor 22 is greater than the measurement limit and the difference between the curvature κs and the curvature κd of a travelled path calculated based on the behavior of vehicle 10 is greater than a predetermined value, control unit 21 determines that the curvature κs is likely to be incorrect and sets the reliability degree W of the curvature κm obtained from map information to the reliability base value Wtmp so that lane estimation is performed based on the curvature κm obtained from map information as long as it does not have an error.

Next, there is described a process of correcting the reliability degree W of the curvature κm based on the accuracy of the curvature κm obtained from map information in a condition [T-4-2] of FIG. 18.

As the curvature κ of a travel route, control unit 21 obtains the curvature κs using external recognition sensor 22 in addition to the curvature κm based on map information. Also, control unit 21 can calculate the curvature Kd of a travelled path of vehicle 10 based on the vehicle behavior.

When vehicle 10 is travelling along lane markings, the difference between the curvature κm/κs of the travel route and the curvature Kd of the travelled path becomes sufficiently small.

Therefore, control unit 21 compares the curvature κs calculated using external recognition sensor 22, the curvature κm obtained from map information, and the curvature Kd calculated based on the behavior of vehicle 10 with each other; and when determining that the accuracy of the curvature κm obtained from map information is low, control unit 21 sets the reliability degree W of the curvature κm obtained from map information to a value obtained by multiplying the reliability base value Wtmp by $10^{-3}$.

The method of determining the accuracy of the curvature κm is described later in detail.

When none of the conditions [T-4-1]-[T-4-2] described above is satisfied, control unit 21 determines that a condition [T-4-3] of FIG. 18 is satisfied, and sets the reliability degree W of the curvature κm obtained from map information to the reliability base value Wtmp.

By correcting the reliability degree W of the curvature κm for each of the conditions [T-4-1]-[T-4-3] of FIG. 18, control unit 21 can incorporate the measurement result of the curvature κm into state estimation (lane estimation) when the curvature κm is correctly measured, and can perform state estimation (lane estimation) while reducing the influence of the measurement result of the curvature κm when the curvature κm is not correctly measured.

Below, there is described a method of determining the accuracy of the curvatures κs and κm that is used for the correction of the reliability degree W.

Control unit 21 determines the accuracy of the curvatures κs and κm by comparing the curvature κs calculated using external recognition sensor 22, the curvature κm obtained from map information, and the curvature κd of a travelled path calculated based on the behavior of vehicle 10.

Here, control unit 21 calculates the curvature κd of a travelled path according to Formula 16.

$$\kappa d = \frac{\delta}{(1 - AV^2)W_b} \quad \text{[Formula 16]}$$

In Formula 16, δ indicates a steering angle, A indicates a stability factor, $W_b$ indicates a wheelbase, and V indicates a vehicle speed.

FIG. 19 is a flowchart illustrating a process of calculating an accuracy JDGκs of the curvature κs measured using external recognition sensor 22. The accuracy JDGκs is used to correct the reliability degree W of the curvature κs (i.e., the condition [T-3-6] of FIG. 17).

Here, control unit 21 sets JDGκs to 1 when determining that the accuracy of the curvature κs is high, and sets JDGκs to 0 when determining that the accuracy of the curvature κs is low.

At step S601, control unit 21 determines whether the previous value of the accuracy JDGκs of the curvature κs is 1.

Then, control unit 21 proceeds to step S602 when the previous value of the accuracy JDGκs of the curvature κs is 1, or proceeds to step S605 when the previous value of the accuracy JDGκs of the curvature κs is not 1 (in other words, when the previous value of the accuracy JDGκs of the curvature κs is 0).

At step S602, control unit 21 determines whether a first decision condition is satisfied. The first decision condition is satisfied when the absolute value of the difference between the curvature κs and the curvature κd is greater than a threshold Th1, and the absolute value of the difference between the curvature κs and the curvature κd is greater than the absolute value of the difference between the curvature κm and the curvature κd.

When the first decision condition is satisfied, that is, when the curvature κs calculated using external recognition sensor 22 deviates significantly from the curvature κd of the travelled path and the deviation is greater than the difference between the curvature κm obtained from map information and the curvature κd of the travelled path, the accuracy of the curvature κs is low (in other words, it is presumable that the curvature κs is incorrectly measured).

When the first decision condition is satisfied, control unit 21 proceeds to step S603 and sets the accuracy JDGκs of the curvature κs to 0.

On the other hand, when the first decision condition is not satisfied, the accuracy of the curvature κs is high (in other words, it is presumable that the curvature κs is correctly measured). In this case, control unit 21 proceeds to step S604 and keeps the accuracy JDGκs of the curvature κs at 1.

Also, when determining that the previous value of the accuracy JDGκs of the curvature κs is not 1 at step S601 and proceeding to step S605, control unit 21 determines whether a second decision condition is satisfied. The second decision condition is satisfied when the absolute value of the difference between the curvature κs and the curvature κd is less than the threshold Th1.

When the second decision condition is satisfied, i.e., when the difference between the curvature κs calculated using external recognition sensor 22 and the curvature κd of the travelled path is less than a predetermined value, the accuracy of the curvature κs calculated using external recognition sensor 22 is high.

When the second decision condition is satisfied, control unit 21 proceeds to step S606 and sets the accuracy JDGκs of the curvature κs to 1.

On the other hand, when the second decision condition is not satisfied, i.e., when the difference between the curvature κs calculated using external recognition sensor 22 and the curvature κd of the travelled path is greater than or equal to a predetermined value, the accuracy of the curvature κs is low. In this case, control unit 21 proceeds to step S607 and keeps the accuracy JDGκs of the curvature κs at 0.

Control unit 21 sets the accuracy JDGκs of the curvature κs as described above, and determines whether the condition [T-3-6] of FIG. 17 is satisfied based on the accuracy JDGκs.

That is, when the accuracy JDGκs is 0, control unit 21 determines that the accuracy of the curvature κs is low and sets the reliability degree W of the curvature κs calculated using external recognition sensor 22 to a value obtained by multiplying the reliability base value Wtmp by $10^{-3}$.

FIG. 20 is a flowchart illustrating a process of calculating an accuracy JDGκm of the curvature κm obtained from map information. The accuracy JDGκm is used to correct the reliability degree W of the curvature κm (the condition [T-4-2] of FIG. 18).

Here, control unit 21 sets JDGκm to 1 when determining that the accuracy of the curvature κm is high, and sets JDGκm to 0 when determining that the accuracy of the curvature κm is low.

At step S701, control unit 21 determines whether the previous value of the accuracy JDGκm of the curvature κm is 1.

Then, control unit 21 proceeds to step S702 when the previous value of the accuracy JDGκm of the curvature κm is 1, or proceeds to step S705 when the previous value of the accuracy JDGκm of the curvature κm is not 1 (in other words, when the previous value of the accuracy JDGκm of the curvature κm is 0).

At step S702, control unit 21 determines whether a first decision condition is satisfied. The first decision condition is satisfied when the absolute value of the difference between the curvature κm and the curvature κd is greater than a threshold Th2 and the absolute value of the difference between the curvature κm and the curvature κd is greater than the absolute value of the difference between the curvature κs and the curvature κd. When the first decision condition is satisfied, that is, when the curvature κm obtained from map information deviates significantly from the curvature κd of the travelled path and the deviation is greater than the difference between the curvature κs calculated using external recognition sensor 22 and the curvature κd of the travelled path, the accuracy of the curvature κm is low, in other words, it is presumable that the curvature κm is incorrectly measured.

When the first decision condition is satisfied, control unit 21 proceeds to step S703 and sets the accuracy JDGκm of the curvature κm to 0.

On the other hand, when the first decision condition is not satisfied, the accuracy of the curvature κm is high, in other words, it is presumable that the curvature κm is correctly measured. In this case, control unit 21 proceeds to step S704 and keeps the accuracy JDGκm of the curvature κm at 1.

When determining that the previous value of the accuracy JDGκm of the curvature κm is not 1 at step S701, control unit 21 proceeds to step S705 and determines whether a second decision condition is satisfied. The second decision condition is satisfied when the absolute value of the difference between the curvature κm and the curvature κd is less than the threshold Th2.

When the second decision condition is satisfied, i.e., when the difference between the curvature κm obtained from map information and the curvature κd of the travelled path is less than a predetermined value, the accuracy of the curvature κm obtained from map information is high.

When the second decision condition is satisfied, control unit 21 proceeds to step S706 and sets the accuracy JDGκm of the curvature κm to 1.

When the second decision condition is not satisfied, i.e., when the difference between the curvature κm obtained from map information and the curvature κd of the travelled path is greater than or equal to a predetermined value, the accuracy of the curvature κm is low. In this case, control unit 21 proceeds to step S707 and keeps the accuracy JDGκm of the curvature κm at 0.

Control unit 21 sets the accuracy JDGκm of the curvature κm as described above and determines whether the condition [T-4-2] of FIG. 18 is satisfied based on the accuracy JDGκm.

That is, when the accuracy JDGκm is 0, control unit 21 determines that the accuracy of the curvature κm is low, and sets the reliability degree W of the curvature κm obtained from map information to a value obtained by multiplying the reliability base value Wtmp by $10^{-3}$.

The technical ideas described in the above embodiment may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, although the vehicle motion control system of the above embodiment includes navigation system 25 as a road shape information acquisition unit, the vehicle motion control system may be configured to not include functions for informing the current location and providing a route guidance to a destination, and may instead include a road shape information acquisition unit comprised of a location information acquisition device such as a GPS for obtaining the current location of vehicle 10 and map information.

Also, the lane estimation device of the present invention may be applied to the lane keeping control (lane departure prevention support system) that performs a steering control only when a lane departure is detected.

Also, although control unit 21 outputs a steering angle command for the lane keeping control to steering control device 27 in the above embodiment, the system may be configured such that a steering angle command for the lane keeping control is output to, for example, a vehicle motion controller (VMC).

REFERENCE SYMBOL LIST

10 . . . vehicle, 20 . . . vehicle motion control system, 21 . . . control unit (vehicle control device, lane estimation device), 21a . . . microcomputer (controller), 22 . . . external recognition sensor (external recognition unit), 23 . . . external recognition processing device (external recognition unit), 24 . . . GPS, 25 . . . navigation system (road shape information acquisition unit), 26 . . . vehicle behavior detection device (vehicle motion state detection unit), 27 . . . steering control device (steering controller), 28 . . . alarm device, 29 . . . HUD device, 30 . . . steering vibration device, 31 . . . steering device

The invention claimed is:

1. A vehicle control device comprising:
a controller that performs calculations based on input information and outputs calculation results,
wherein the controller is configured to
obtain first information on lane markings defining a lane in which a vehicle travels based on external information obtained from an external recognition unit,
obtain second information on a curvature of the lane based on information on a road shape obtained from a road shape information acquisition unit,
obtain third information on a behavior of the vehicle based on a physical quantity that is related to a motion state of the vehicle and obtained from a vehicle motion state detection unit,
estimates information on curvatures relative positions of the vehicle with respect to the lane markings based on the first information, the second information, and the third information, and
output, based on the lane information, a control command related to a steering action for performing a lane keeping control for the vehicle,
wherein the controller
obtains reliability degrees according to differences between observed values based on the first information and the second information and estimated values of the observed values obtained based on estimated values of the lane information in a previous sampling and the third information,
estimates the lane information by weighting the first information, the second information, and the third information based on the reliability degrees, and
is operatively coupled to a display, so that the estimated lane information,
which includes the reliability degrees, is presented to a user via the display.

2. The vehicle control device as claimed in claim 1, wherein the controller corrects the reliability degrees according to variations of the observed values.

3. The vehicle control device as claimed in claim 1, wherein the controller corrects the reliability degrees based on information on a relative distance between the vehicle and a leading vehicle that travels in front of the vehicle and is recognized by the external recognition unit.

4. The vehicle control device as claimed in claim 1, wherein the controller corrects the reliability degrees based on a difference between the second information and a travelled path of the vehicle obtained from the third information.

5. The vehicle control device as claimed in claim 1, wherein the controller corrects the reliability degrees based on a speed of the vehicle.

6. The vehicle control device as claimed in claim 1, wherein the controller estimates the lane information using a predetermined constraint.

7. The vehicle control device as claimed in claim 6, wherein the controller estimates the lane information using the constraint that sets a limit on a change amount of the curvature of the lane.

8. The vehicle control device as claimed in claim 6, wherein the controller estimates the lane information using the constraint that sets a limit on a change amount of a lateral position indicating an amount of shift of the vehicle from a center of the lane.

9. The vehicle control device as claimed in claim 6, wherein the controller estimates the lane information using the constraint that sets a limit on a distance between right and left lane markings.

10. The vehicle control device as claimed in claim 1, wherein the road shape information acquisition unit is a navigation system.

11. The vehicle control device as claimed in claim 1, wherein the information on the road shape is information on a shape of a road that includes an outside of the lane markings and on which the vehicle can travel.

12. A vehicle control method executed by a vehicle control device mounted on a vehicle comprising steps of:
obtaining first information on lane markings defining a lane in which a vehicle travels based on external information obtained from an external recognition unit;
obtaining second information on a curvature of the lane based on information on a road shape obtained from a road shape information acquisition unit;
obtaining third information on a behavior of the vehicle based on a physical quantity that is related to a motion state of the vehicle and obtained from a vehicle motion state detection unit;
estimating information on curvatures and relative positions of the vehicle with respect to the lane markings based on the first information, the second information, and the third information; and
outputting, based on the lane information, a control command related to a steering action for performing a lane keeping control for the vehicle,
wherein the step of estimating lane information includes:
a step of obtaining reliability degrees according to differences between observed values based on the first information and the second information and estimated values of the observed values obtained based on estimated values of the lane information in a previous sampling and the third information,
a step of estimating the lane information by weighting the first information, the second information, and the third information based on the reliability degrees, and wherein
the controller is operatively coupled to a display, so that the estimated lane information, which includes the reliability degrees, is presented to a user via the display.

13. A vehicle motion control system comprising:
an external recognition unit that obtains external information of a vehicle;
a vehicle motion state detection unit that detects a physical quantity related to a motion state of the vehicle;
a road shape information acquisition unit that obtains information on a road shape;
a controller that is configured to
obtain first information on lane markings defining a lane in which the vehicle travels based on the external information obtained from the external recognition unit,
obtain second information on a curvature of the lane based on the information on the road shape obtained from the road shape information acquisition unit,
obtain third information on a behavior of the vehicle based on the physical quantity that is related to the motion state of the vehicle and obtained from the vehicle motion state detection unit,
estimate lane information on curvatures and relative positions of the vehicle with respect to the lane markings based on the first information, the second information, and the third information, output, based on the lane information, a control command related to a steering action for performing a lane keeping control for the vehicle, obtain reliability degrees according to differences between observed values based on the first information and the second information and estimated values of the observed values obtained based on estimated values of the lane information in a previous sampling and the third information, and estimate the lane information by weighting the first information, the second information, and the third information based on the reliability degrees; and a steering control device of the vehicle that obtains the control command output from the controller, wherein the controller is operatively coupled to a display, so that the estimated lane information, which includes the reliability degrees, is presented to a user via the display.

14. A lane estimation device comprising:

a controller that performs calculations based on input information and outputs calculation results, wherein the controller is configured to obtain first information on lane markings defining a lane in which a vehicle travels based on external information obtained from an external recognition unit, obtain second information on a curvature of the lane based on information on a road shape obtained from a road shape information acquisition unit, obtain third information on a behavior of the vehicle based on a physical quantity that is related to a motion state of the vehicle and obtained from a vehicle motion state detection unit, and estimate lane information on curvatures and relative positions of the vehicle with respect to the lane markings based on the first information, the second information, and the third information, wherein the controller obtains reliability degrees according to differences between observed values based on the first information and the second information and estimated values of the observed values obtained based on estimated values of the lane information in a previous sampling and the third information, estimates the lane information by weighting the first information, the second information, and the third information based on the reliability degrees, and is operatively coupled to a display, so that the estimated lane information, which includes the reliability degrees, is presented to a user via the display.

* * * * *